(12) United States Patent
Guzman et al.

(10) Patent No.: US 8,689,116 B2
(45) Date of Patent: Apr. 1, 2014

(54) EMAIL USER INTERFACE

(75) Inventors: Angela Guzman, San Jose, CA (US);
Bas Ording, San Francisco, CA (US);
Brendan Langoulant, San Francisco,
CA (US); Daniel Shteremberg, San
Francisco, CA (US); **Patrick L.
Coffman**, San Francisco, CA (US);
Stephen Decker, San Francisco, CA
(US); Stephen O. Lemay, Palo Alto, CA
(US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 13/165,681

(22) Filed: Jun. 21, 2011

(65) Prior Publication Data
US 2012/0185781 A1    Jul. 19, 2012

Related U.S. Application Data

(60) Provisional application No. 61/433,178, filed on Jan. 14, 2011.

(51) Int. Cl.
*G06F 3/00* (2006.01)
*G06F 3/01* (2006.01)

(52) U.S. Cl.
USPC ............ 715/752; 715/796; 715/799; 715/803

(58) Field of Classification Search
USPC .......................... 715/752, 753, 796, 799, 803
See application file for complete search history.

(56) References Cited

U.S. PATENT DOCUMENTS

| 6,285,364 | B1 | 9/2001 | Giordano, III et al. |
| 7,130,885 | B2 | 10/2006 | Chandra et al. |
| 7,219,129 | B2 * | 5/2007 | Weissman ..................... 709/206 |
| 7,353,234 | B2 | 4/2008 | Kimball et al. |
| 7,370,277 | B1 | 5/2008 | Canfield et al. |
| 7,577,918 | B2 | 8/2009 | Lindsay |
| 7,620,407 | B1 | 11/2009 | Donald et al. |
| 7,756,936 | B2 | 7/2010 | Rosenberg et al. |
| 7,787,866 | B2 * | 8/2010 | Jung ........................... 455/412.1 |
| 8,051,133 | B2 * | 11/2011 | Schulz et al. ................. 709/206 |
| 8,073,910 | B2 | 12/2011 | Tokuda et al. |
| 8,132,100 | B2 * | 3/2012 | Seo et al. ...................... 715/706 |

(Continued)

FOREIGN PATENT DOCUMENTS

WO    WO-2012/097237 A2    7/2012

OTHER PUBLICATIONS

"International Application Serial No. PCT/US2012/021223, International Search Report mailed Jul. 17, 2012", 4 pgs.

(Continued)

*Primary Examiner* — Nicholas Augustine
(74) *Attorney, Agent, or Firm* — Schwegman Lundberg & Woessner, P.A.

(57) ABSTRACT

Exemplary methods, apparatuses, and systems receive a reply or forward command for a selected email message in an email user interface and display a composition window in response to the command, wherein the displaying includes a sequence of images to create the illusion of the composition window popping out of the selected email message, the sequence of images including an initial image that is a copy of the selected email message, a final image of the composition window including an editable body, and at least one image between the initial image and the final image that has characteristics of both the initial and final images.

18 Claims, 47 Drawing Sheets

(56) References Cited

U.S. PATENT DOCUMENTS

| | | | |
|---|---|---|---|
| 8,161,122 B2* | 4/2012 | Sood et al. | 709/206 |
| 8,413,059 B2* | 4/2013 | Lee et al. | 715/752 |
| 8,413,068 B2 | 4/2013 | Pegg | |
| 2004/0004613 A1* | 1/2004 | Adler | 345/419 |
| 2004/0054737 A1* | 3/2004 | Daniell | 709/206 |
| 2005/0223063 A1 | 10/2005 | Chang et al. | |
| 2006/0020904 A1 | 1/2006 | Aaltonen et al. | |
| 2006/0179466 A1* | 8/2006 | Pearson et al. | 725/109 |
| 2006/0236249 A1* | 10/2006 | Weissman | 715/752 |
| 2008/0126951 A1* | 5/2008 | Sood et al. | 715/752 |
| 2009/0128571 A1 | 5/2009 | Smith et al. | |
| 2009/0128581 A1 | 5/2009 | Brid et al. | |
| 2010/0004008 A1 | 1/2010 | Abolrous et al. | |
| 2010/0058231 A1* | 3/2010 | Duarte et al. | 715/800 |
| 2010/0070880 A1* | 3/2010 | Chinta | 715/752 |
| 2011/0163970 A1* | 7/2011 | Lemay | 345/173 |
| 2011/0213845 A1* | 9/2011 | Logan et al. | 709/206 |
| 2012/0096389 A1* | 4/2012 | Flam et al. | 715/777 |
| 2012/0173633 A1* | 7/2012 | Balabhadrapatruni et al. | 709/206 |

OTHER PUBLICATIONS

"International Application Serial No. PCT/US2012/021223, Written Opinion mailed Jul. 17, 2012", 6 pgs.

PCT Invitation to Pay Additional Fees and, Where Applicable, Protest Fee mailed Apr. 27, 2012, for PCTUS12/21223, International Filing Date Jan. 13, 2012, two pages.

* cited by examiner

EMAIL USER INTERFACE

CROSS-REFERENCE TO RELATED APPLICATION

This application claims the benefit of the earlier filing date of co-pending U.S. Provisional Patent Application No. 61/433,178, filed Jan. 14, 2011.

FIELD

The various embodiments described herein relate to apparatuses, systems, and methods to manage and display an email user interface.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2011, Apple Inc., All Rights Reserved.

BACKGROUND

An email user interface displays email messages in an orderly format and provides a user an interactive medium for the organization, manipulation, and generation of email messages. Email messages can be generated by replying to or forwarding an email message stored and displayed in the email user interface. For some email user interfaces, an input to reply to or forward an email results in a pop up composition window. Additionally, email messages can be organized into a plurality of mailboxes or folders.

SUMMARY OF THE DESCRIPTION

Exemplary methods, apparatuses, and systems receive a reply or forward command for a selected email message in an email user interface and display a composition window in response to the command, wherein the displaying includes a sequence of images to create the illusion of the composition window popping out of the selected email message, the sequence of images including an initial image that is a copy of the selected email message, a final image of the composition window including an editable body, and at least one image between the initial image and the final image that has characteristics of both the initial and final images.

For one embodiment, exemplary methods, apparatuses, and systems receive a reply or forward command for a selected email message, determine that the email user interface is in full screen mode and that the selected email message is at least partially outside of a visible area of the email user interface, and display a composition window in response to receiving the command while in full screen mode, wherein the displaying includes a sequence of images to create the illusion of the composition window sliding up from the bottom of the screen.

For yet another embodiment, exemplary methods, apparatuses, and systems display an email user interface including a collapsible panel of mailboxes and folders and favorites bar including a plurality of the mailboxes and folders, wherein the favorites bar is displayed separately from and independently of whether or not the collapsible panel is collapsed or not and wherein one of the plurality of mailboxes and folders in the favorites bar is a hierarchical folder that includes a subfolder that is accessible via a drop down menu from the hierarchical folder in the favorites bar.

BRIEF DESCRIPTION OF THE DRAWINGS

The present invention is illustrated by way of example and not limitation in the figures of the accompanying drawings, in which like references indicate similar elements, and in which:

Figure 14:
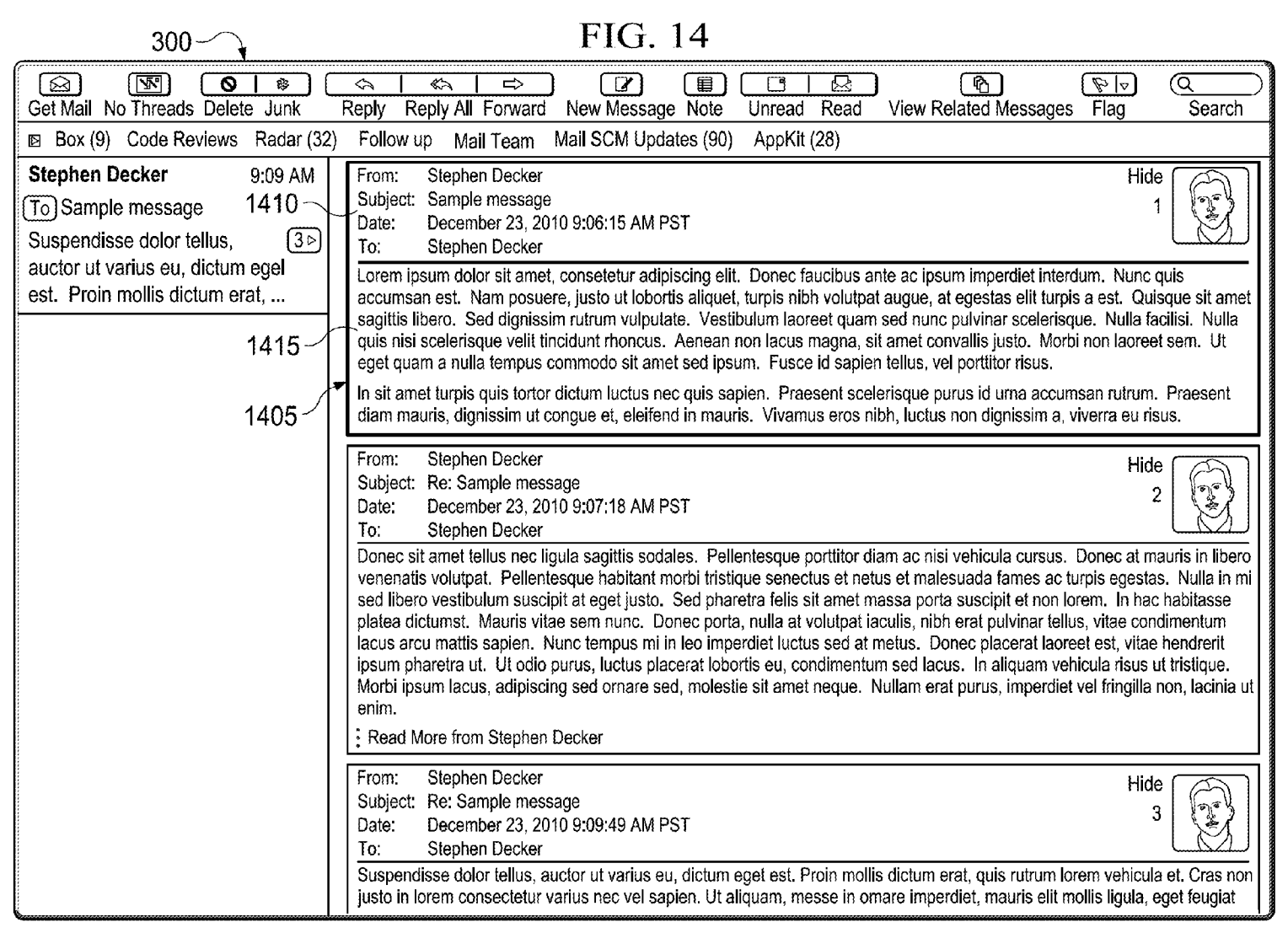

FIGS. 14-19 illustrate an exemplary mail user interface in full screen mode and generation of a composition window for responding to an existing message when the existing message is at least partially off screen;

FIG. 25 illustrates an exemplary mail user interface displaying dynamic controls for a message.

DETAILED DESCRIPTION

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
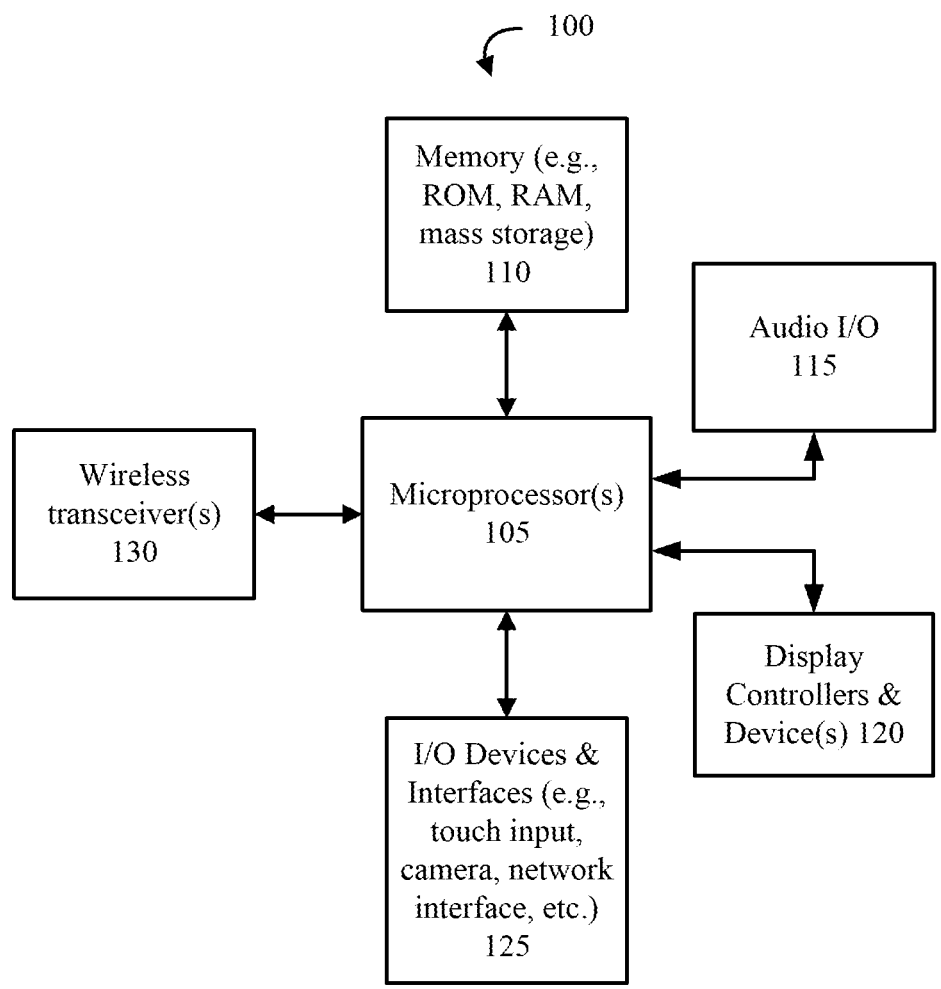
FIG. 1 illustrates, in block diagram form, an exemplary processing system that can group email messages into conversations.

FIG. 1 illustrates, in block diagram form, an exemplary data processing system 100 that can display a composition window and a favorites bar including a plurality of mailboxes or folders as described herein. Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory ("RAM"), Read Only Memory ("ROM"), Flash, Phase Change Memory ("PCM"), or other types of data storage.

The data processing system 100 also includes an audio input/output subsystem 115 which may include a microphone and/or a speaker for, for example, playing back music, providing telephone or voice/video chat functionality through the speaker and microphone, etc.

A display controller and display device 120 provides a visual user interface for the user; this user interface may include a graphical user interface which, for example, is similar to that shown on a Macintosh computer when running Mac OS operating system software or an iPad, iPhone, or similar device when running iOS operating system software.

The data processing system 100 also includes one or more wireless transceivers 130, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various components shown in FIG. 1.

The data processing system 100 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing system 100 may be a network computer or an embedded processing device within another device or consumer electronic product.

The system 100 also includes one or more input or output ("I/O") devices and interfaces 125 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 100. The I/O devices and interfaces 125 may include a connector for a dock or a connector for a USB interface, FireWire, etc. to connect the system 100 with another device, external component, or a network.

It will be appreciated that additional components, not shown, may also be part of the system 100, and, in certain embodiments, fewer components than that shown in FIG. 1 may also be used in a data processing system 100. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. The software may further be transmitted or received over a network (not shown) via a network interface device 125. In various embodiments, hardwired circuitry may be used in combination with the software instructions to implement the present embodiments. Thus, the techniques are not limited to any specific combination of hardware circuitry and software, or to any particular source for the instructions executed by the data processing system 100.

Figure 2:
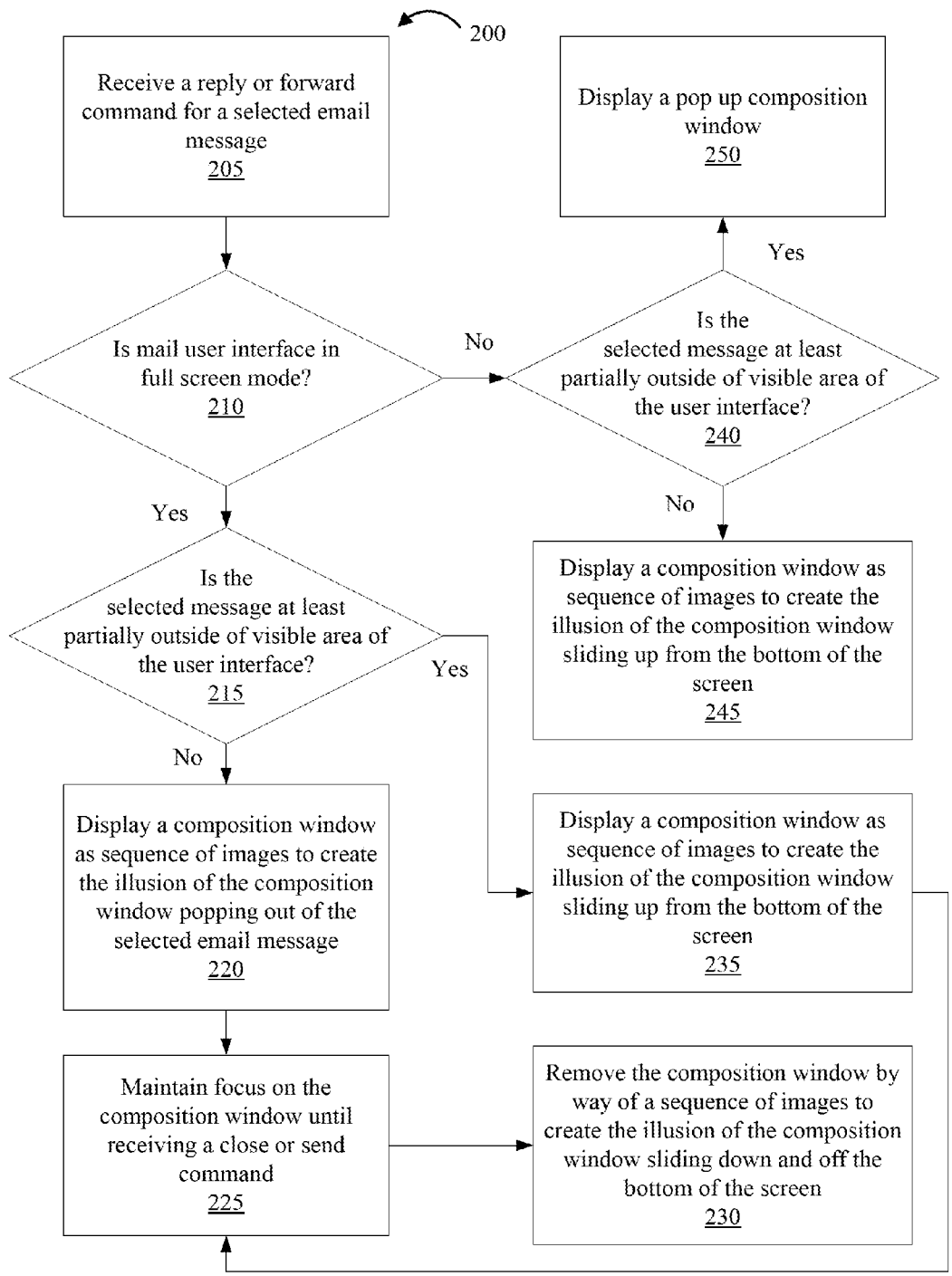
FIG. 2 is a flow chart that illustrates an exemplary method of generating a composition window for responding to an existing message.
Figure 3:
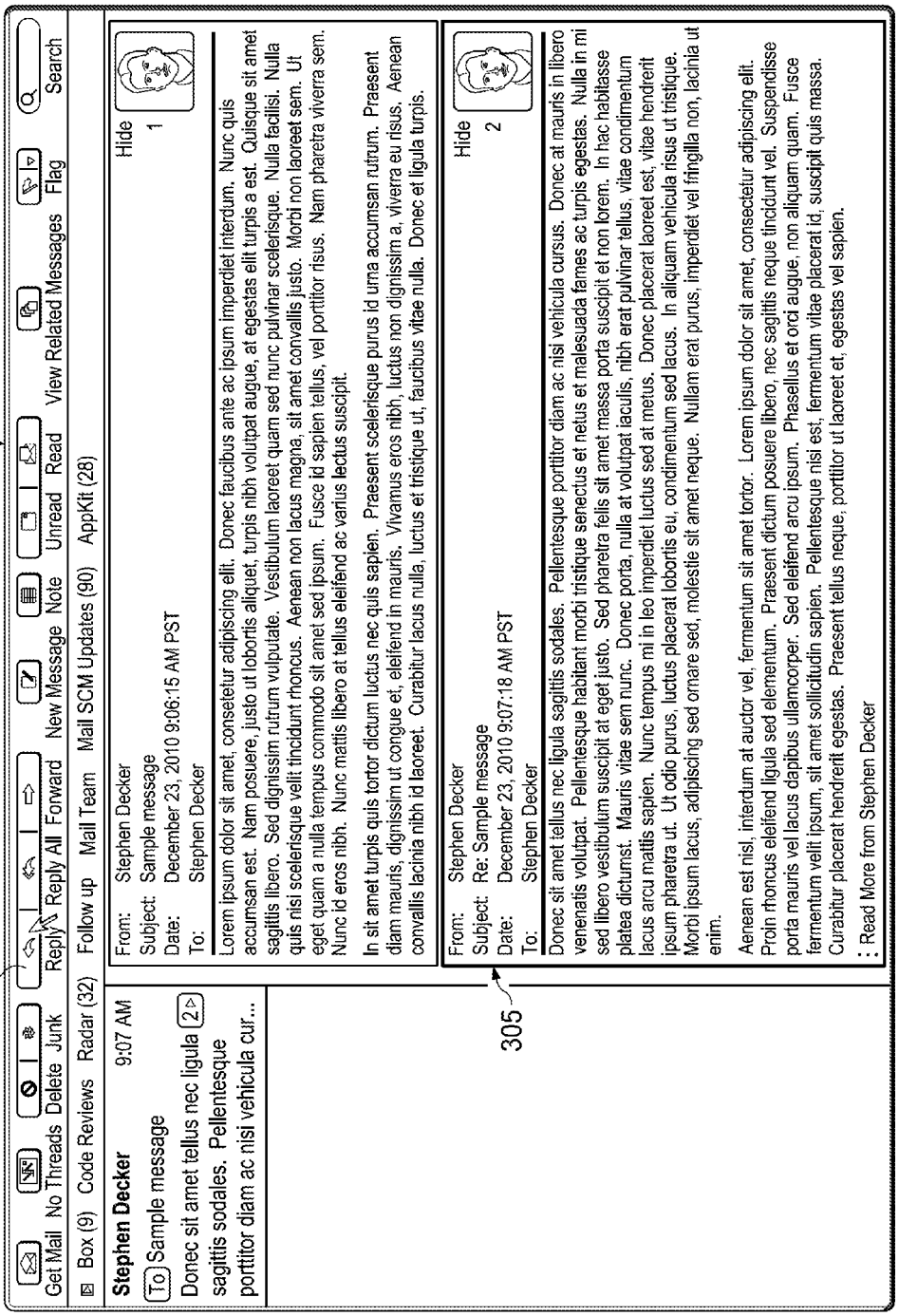
FIGS. 3-8 illustrate an exemplary mail user interface in full screen mode and generation of a composition window for responding to an existing message.

FIG. 2 is a flow chart that illustrates an exemplary method 200 of generating a composition window for responding to an existing message. At block 205, the data processing system 100 receives a command to respond to a selected email message (e.g., reply, reply to all, or forward). At block 210, the data processing system determines if the mail user interface is in full screen mode. As used herein, full screen mode refers to the window displaying the mail user interface being of such a size as to cover the entire display area of the screen in at least one of the horizontal and vertical directions. For one embodiment, full screen mode covers the entire display area of the screen in both horizontal and vertical directions. For one embodiment, an application dock or quick launch toolbar remains visible when the mail user interface is in full screen mode.

For simplicity, the description and figures refer to using full screen mode as the determination. For an alternate embodiment, another setting is used interchangeably with the full screen mode. For example, instead of determining if the mail user interface is in full screen mode, the data processing system 100 determines if a preference has been set, e.g., by default setting or via a drop down menu or other user preference interface. In effect, the setting of the preference would result in the data processing system 100 proceeding with the method 200 in the same manner as it would if the determination was based upon whether or not the mail user interface is in full screen mode.

If the mail user interface is in full screen mode, at block 215, the data processing system 100 determines if the selected message is at least partially outside of the visible area of the user interface. If the selected message is not outside of the visible area of the user interface, at block 220, the data processing system 100 displays a composition window as a sequence of images (e.g., as an animation) to create the illusion of the composition window popping out of the selected email message.

Figure 4:
Figure 5:
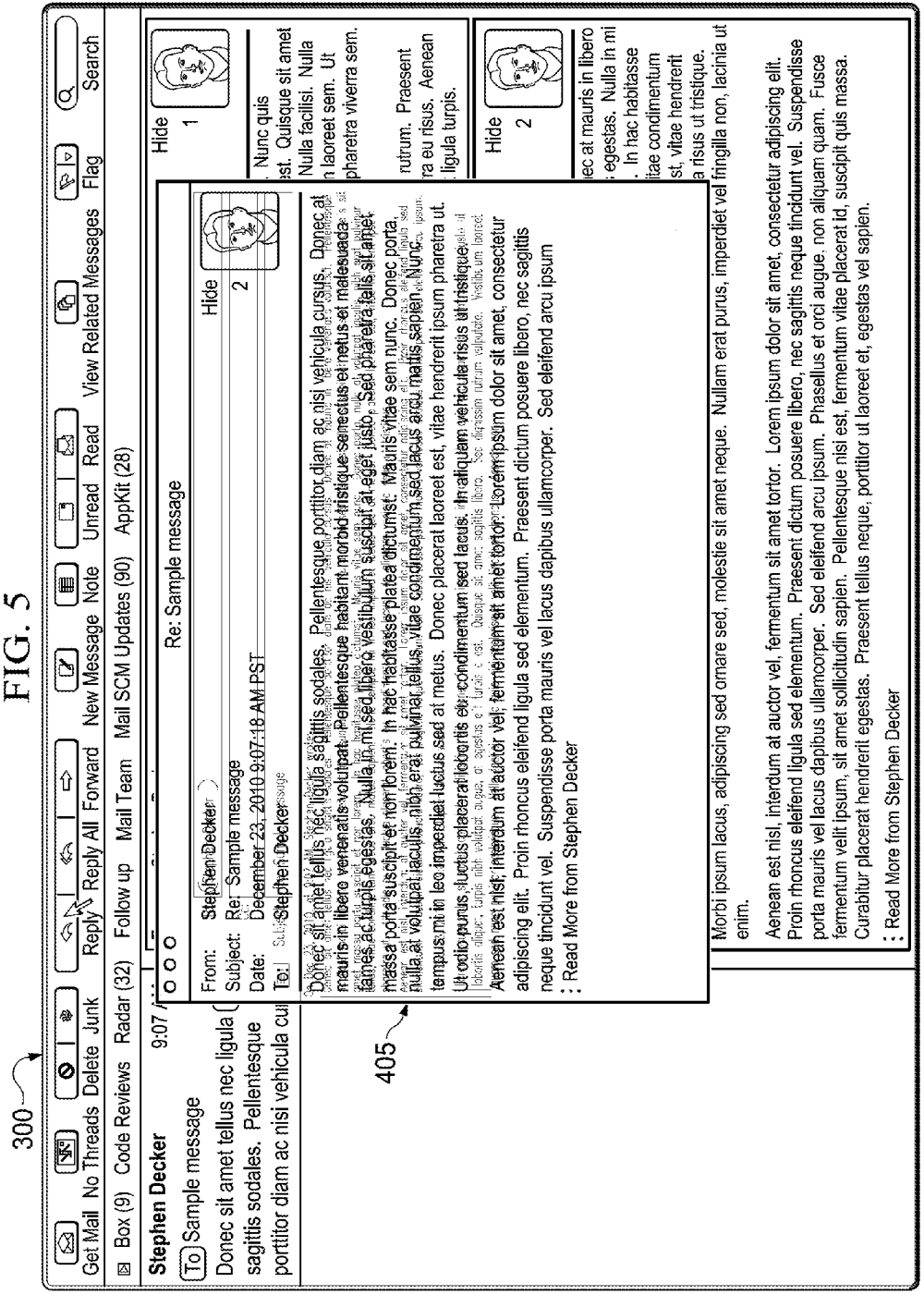
Figure 6:
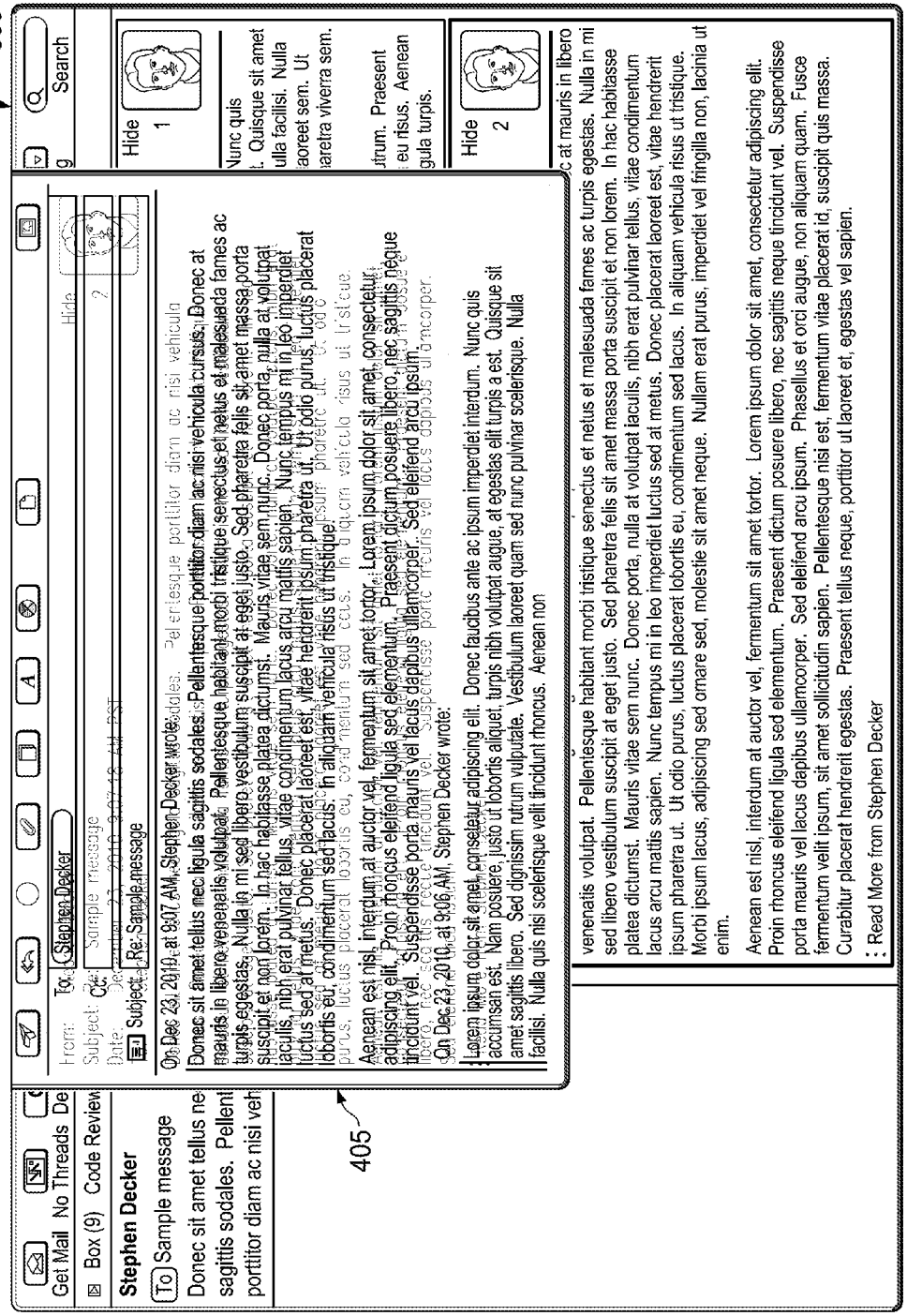
Figure 7:
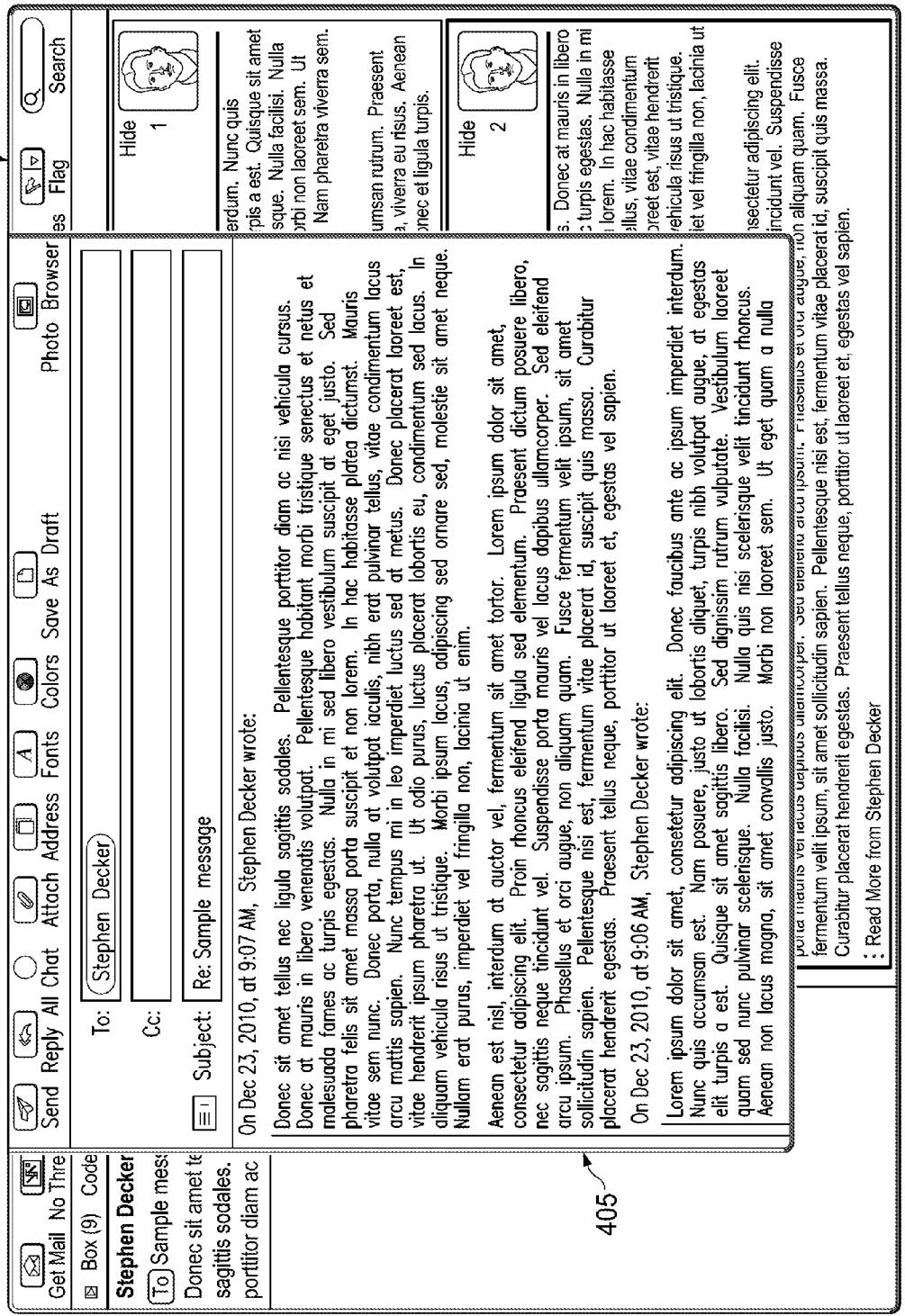
Figure 8:
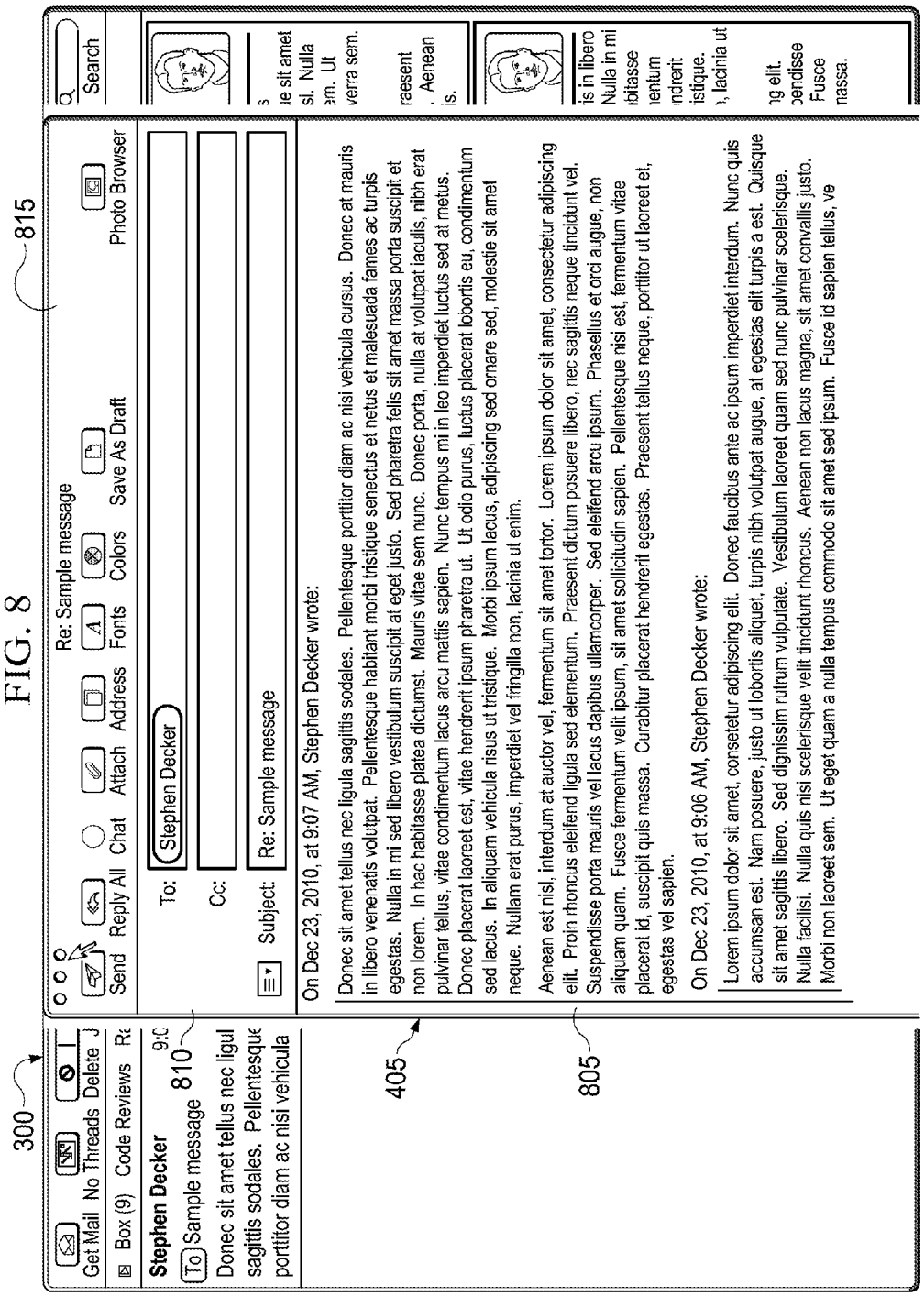

FIGS. 3-8 illustrate an exemplary mail user interface 300 in full screen mode and generation of a composition window as an animation creating the illusion of the composition window popping out of the selected email message ("pop out animation"). For example, in FIG. 3, a message 305 is selected with the mail user interface 300 (e.g., a selected message will have a bold border, be highlighted, or emphasized in another manner). The data processing system receives a reply command 310, and determines that the mail user interface 300 is in full screen mode and that the selected message 305 is within the visible area of the mail user interface. FIG. 4 illustrates one of the first images 405 in a sequence of images for the composition window that is a copy of and displayed on top of the selected email message 305. For one embodiment, the first image or one of the first images 405 in the pop out animation is a partial copy of the selected email message 305. For example, the first image of the composition window 405 may include the majority of elements of the selected email message 305 but also include an element or partial element of the final composition window that is not present in the selected email message 305. FIGS. 5-8 illustrate exemplary images 405 in the animation in which the composition window 405 grows in size and moves along an arced path originating from the selected email message 305 as the sequence of images progresses from the initial image to the final image. For one embodiment, elements of the selected email message 305 that appear in the initial image 405 but not in the final composition window 405, such as the header 410 and location of the text from the body 415 of the selected email message 305, fade-out as the sequence of images progresses from the initial image to the final image. For one embodiment, elements of the that appear in the final composition window 405 but not in the initial image 405, such as a composition body 805 (which may include quoted text from the selected message 305), a composition window header 810, and toolbar 815, fade-in as the sequence of images progresses from the initial image to the final image. For alternate embodiments, more or less images are used to create the pop out animation.

For one embodiment, at block 225, the data processing system 100 maintains focus on the composition window 405 until the message is closed (when the mail user interface 300 is in full screen mode). Maintaining focus, as used herein, refers to the data processing system 100 allowing the user to interact with the composition window 405 (e.g., typing in any of the message header fields, editing the body of the message, interacting with various buttons on the composition window 405, etc.) but not letting the user bring the main window of the mail user interface 300 to the forefront, interact with another message or window, etc. until the message in the composition window 405 is sent or the composition window is otherwise closed. For one embodiment, elements of the email user interface 300 behind the composition window 405 are dimmed and not selectable until the composition window is closed (e.g., canceled or sent). Once the window is closed, at block 230, the composition window 405 is removed from the display by way of a sequence of images to create the illusion of the composition window sliding down and off of the bottom of the screen ("slide down animation").

Figure 9:
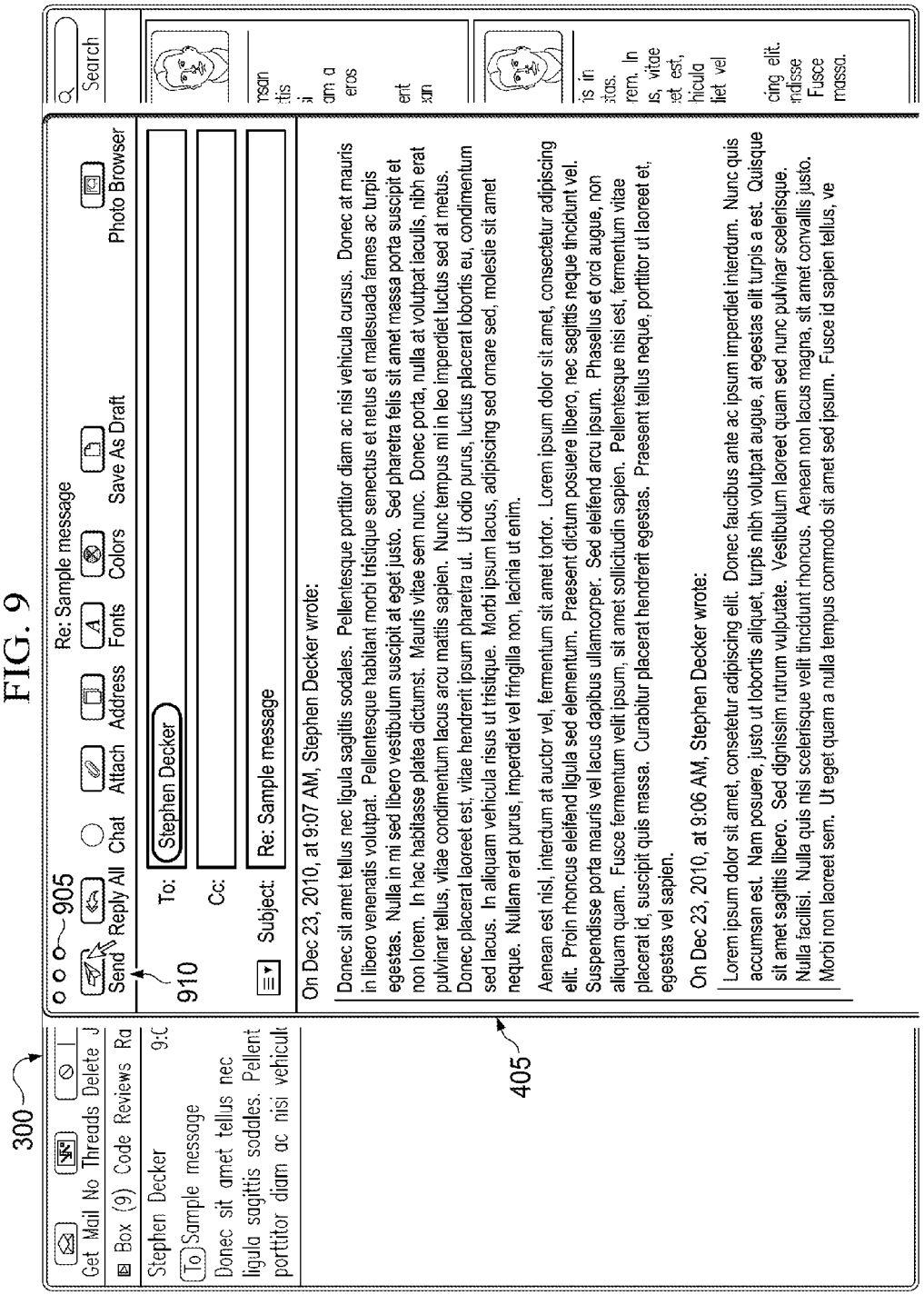
FIGS. 9-13 illustrate an exemplary mail user interface in full screen mode in which the composition window maintains focus until the message is canceled or sent.
Figure 10:
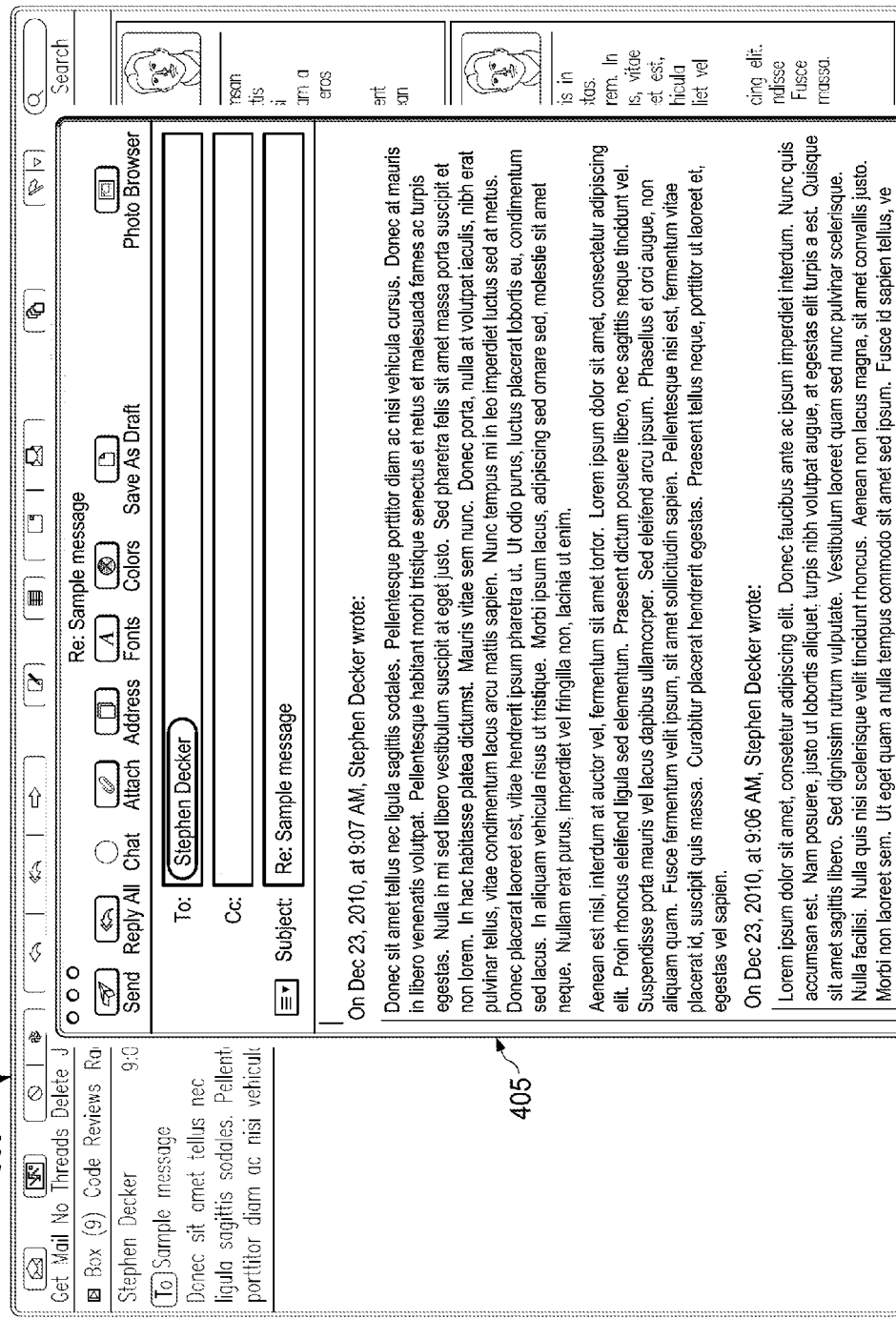
Figure 11:
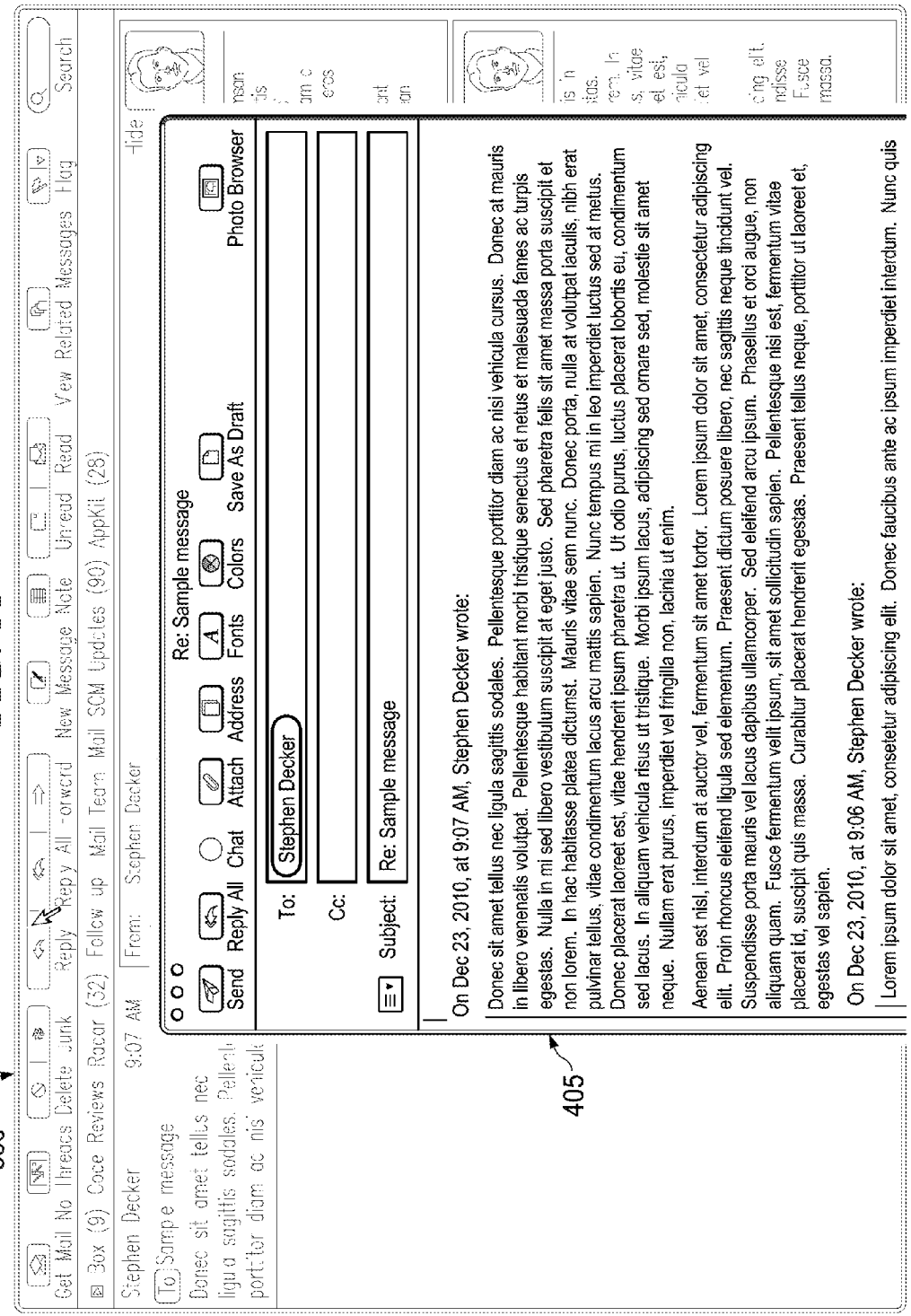
Figure 12:
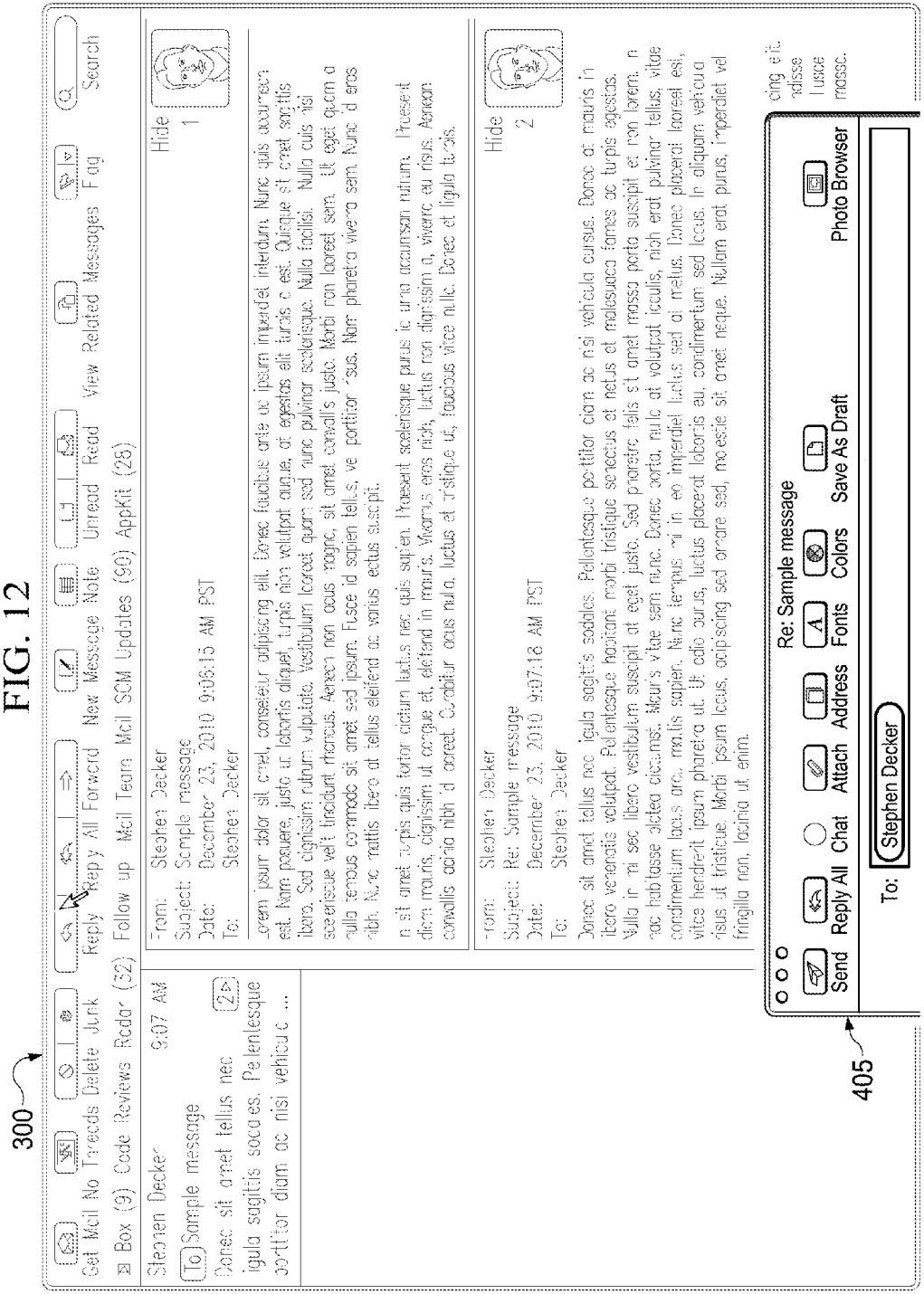
Figure 13:

FIGS. 9-13 illustrate the exemplary mail user interface 405 in full screen mode in which the composition window 405 maintains focus until the message is closed e.g., by selecting close window icon 905, send icon 910, or otherwise closing or sending the composition window 405 by way of a keyboard shortcut, drop down menu, etc. For one embodiment, as illustrated in FIG. 9, the mail user interface 300, other than composition window 405, is dimmed to demonstrate that focus is being maintained on the composition window 405. For an alternate embodiment, the composition window 405 is highlighted to demonstrate that focus is being maintained on the composition window 405. Once the window is closed, the composition window 405 is removed from the display by way of the slide down animation. For example, FIGS. 10-12 illustrate the exemplary composition window 405 at lower and lower positions within the screen with less and less of the composition window 405 remaining visible. FIG. 13 illustrates the exemplary mail user interface 300 once the composition window 405 has completely disappeared off of the bottom of the screen and focus has returned to the main window of the mail user interface 300 (e.g., mail user interface 300 is no longer dimmed). For alternate embodiments, more or less images are used to create the slide down animation. For an alternate embodiment, the composition window 405 is animated to slide off of the screen in another direction (e.g., off of the top, left, or right of the screen).

For one embodiment, if the mail user interface 300 is in full screen mode and the selected message is at least partially outside of the visible area of the mail user interface, at block 235, the data processing system 100 displays a composition window as a sequence of images to create the illusion of the composition window sliding up from the bottom of the screen ("slide up animation").

Figure 15:
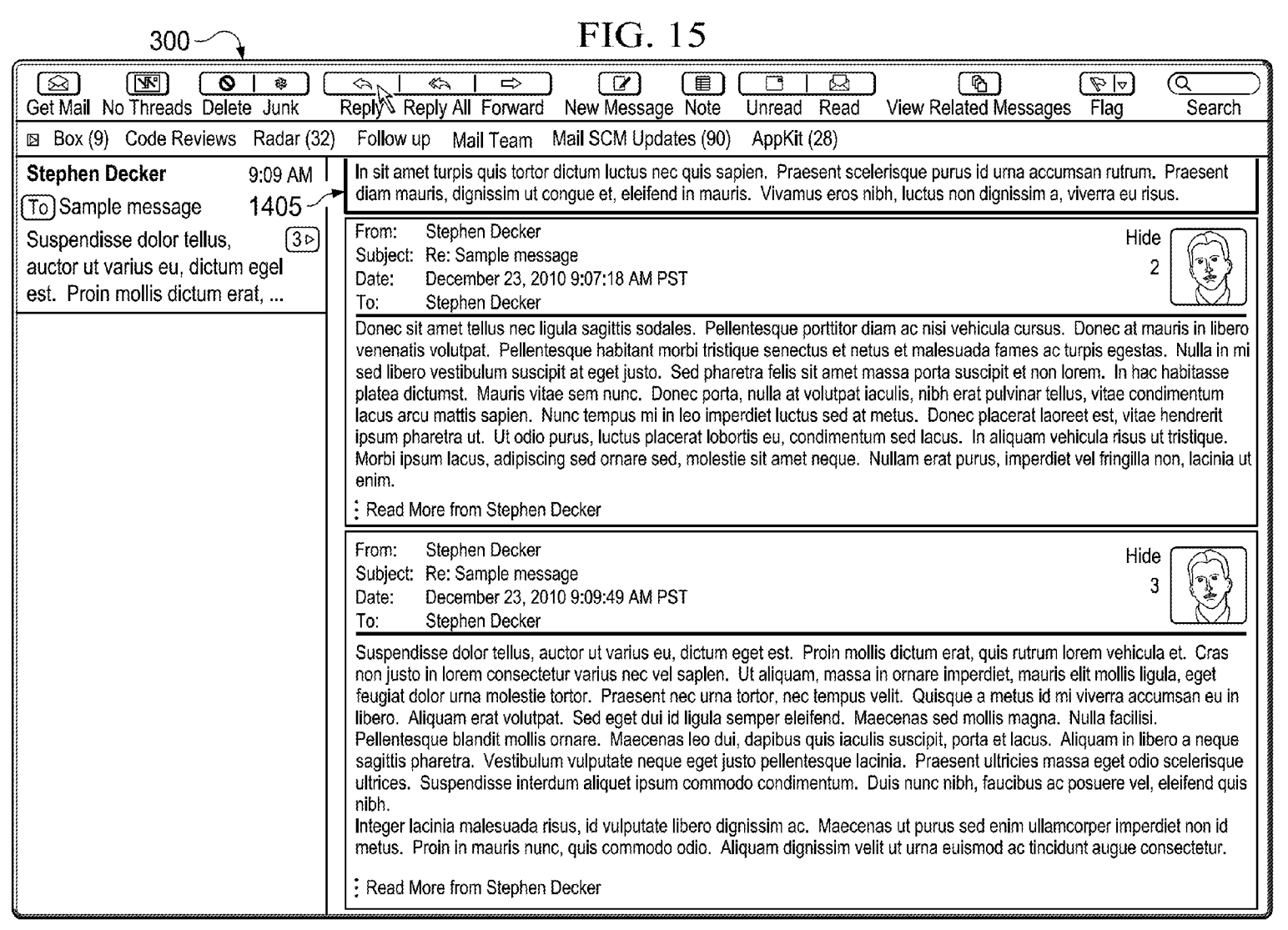
Figure 16:
Figure 17:
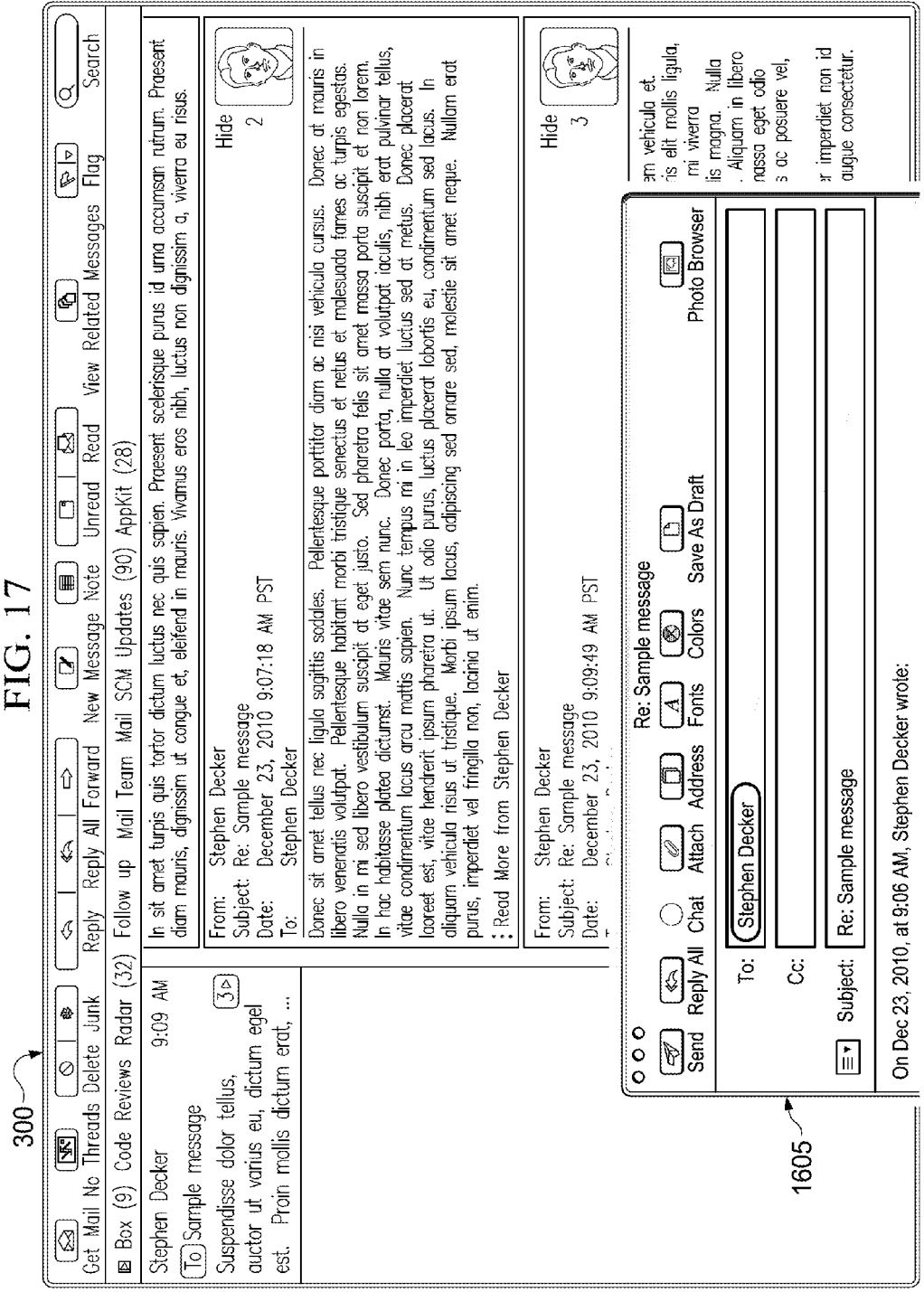
Figure 18:
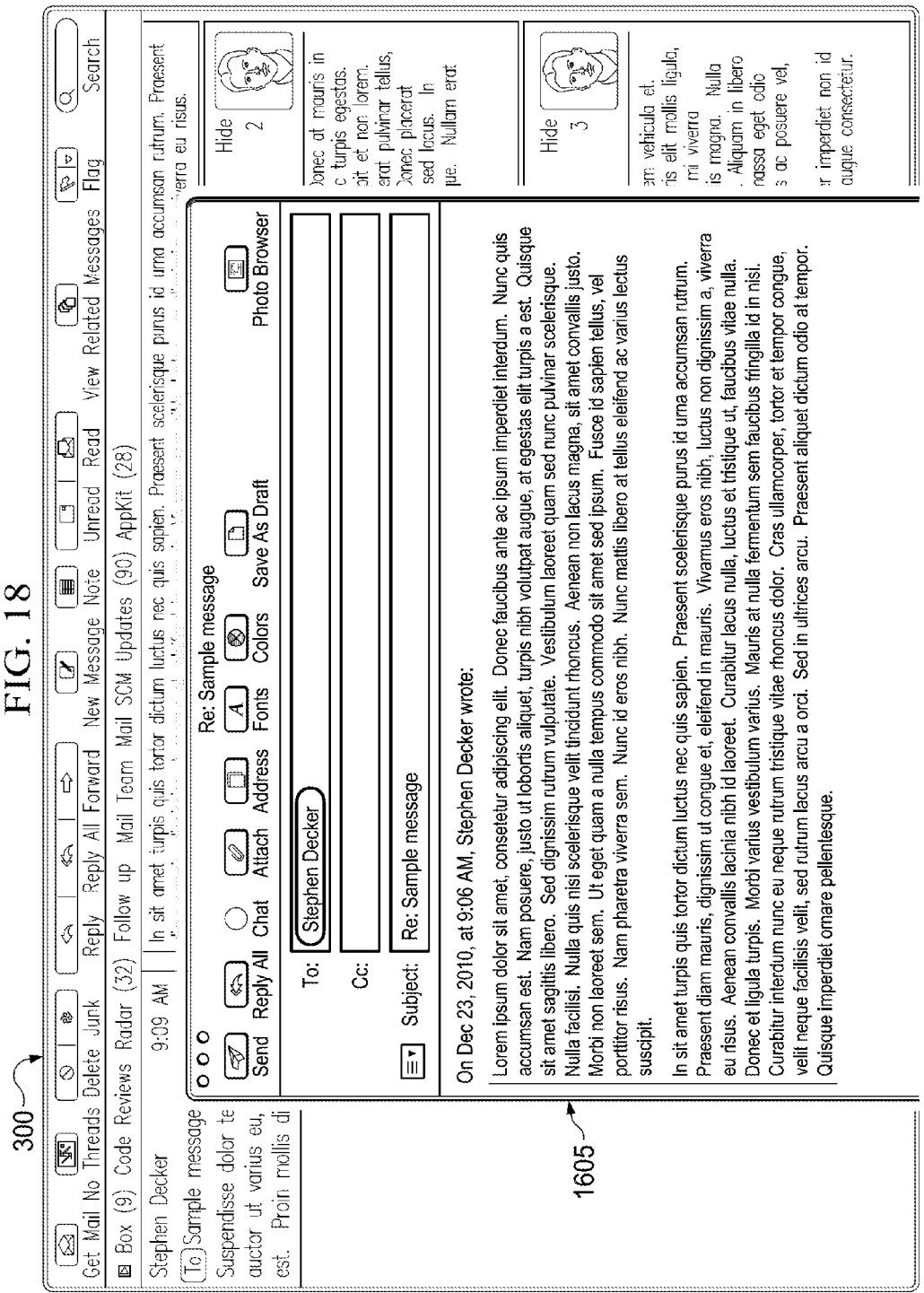
Figure 19:
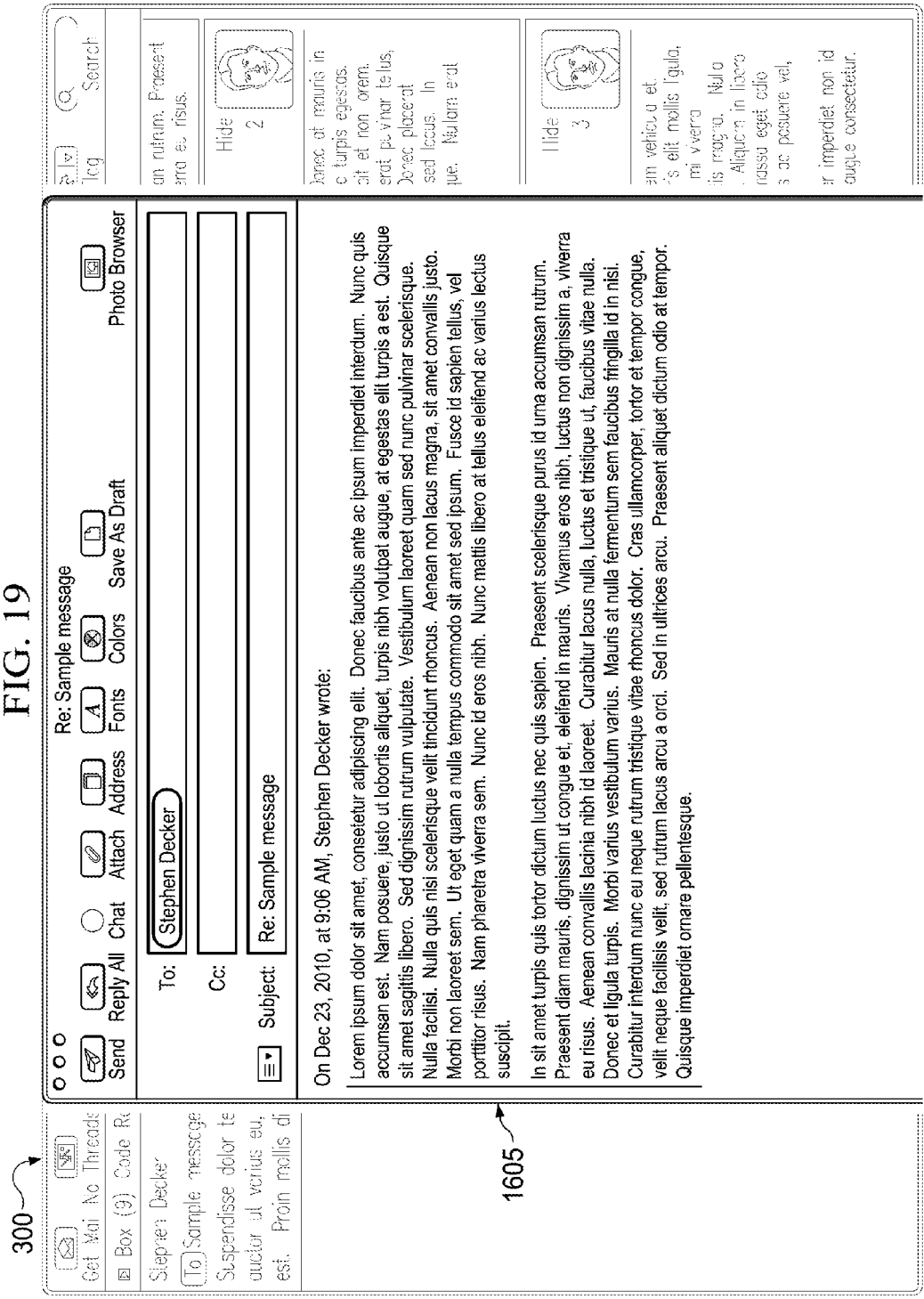
Figure 20:
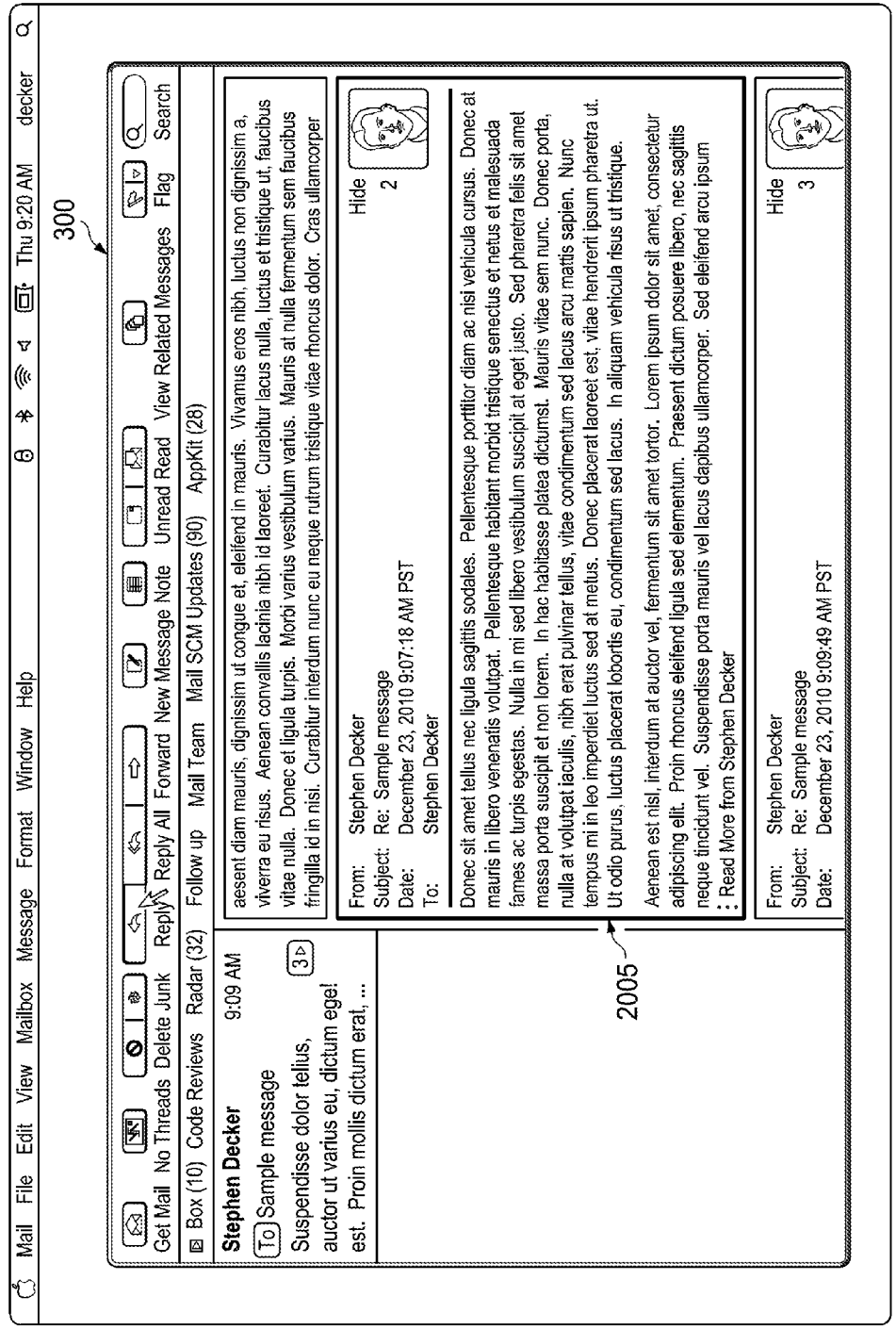
FIGS. 20-23 illustrate an exemplary generation of a composition window for responding to an existing message when the mail user interface is not in full screen mode.
Figure 21:
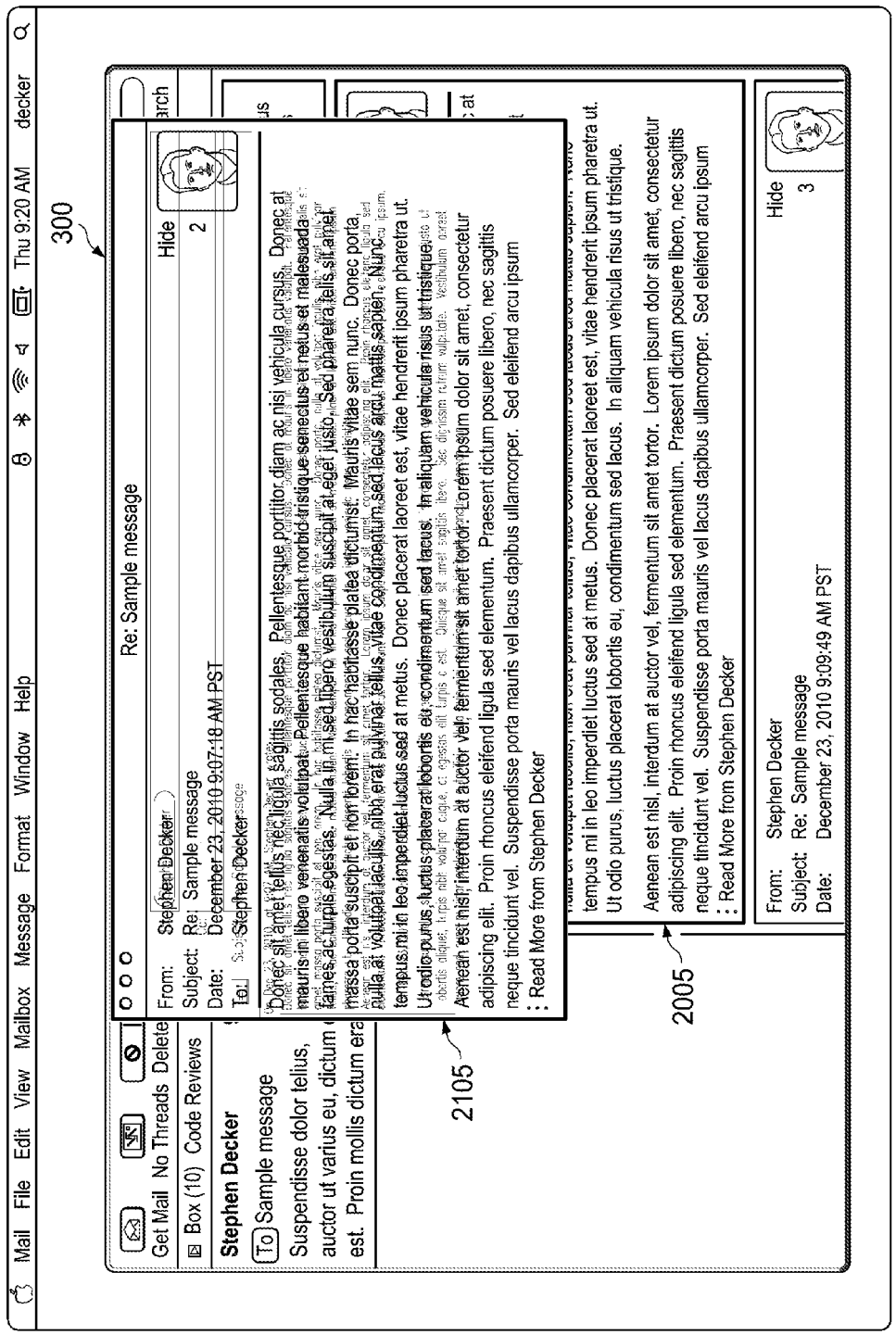
Figure 22:
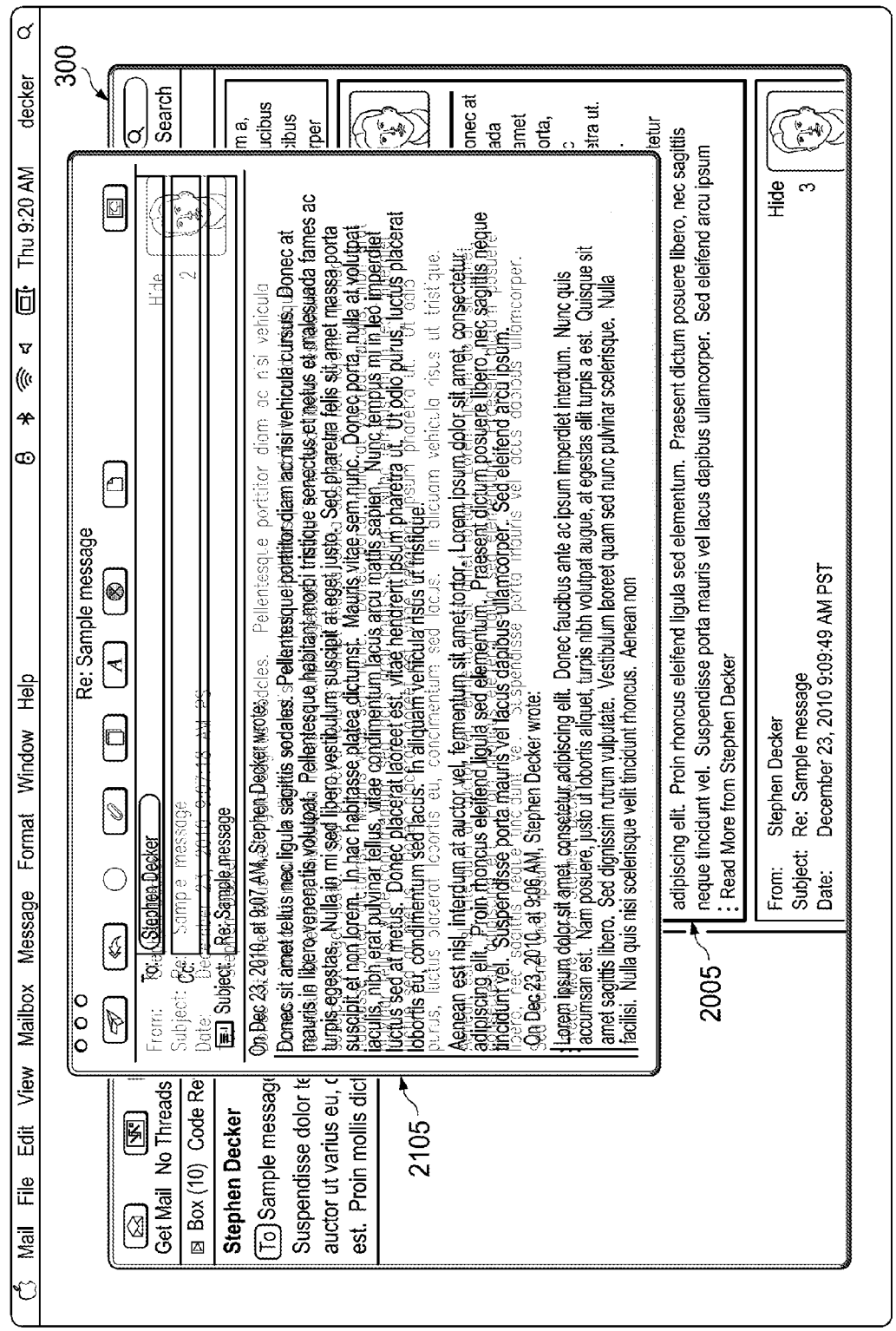
Figure 23:
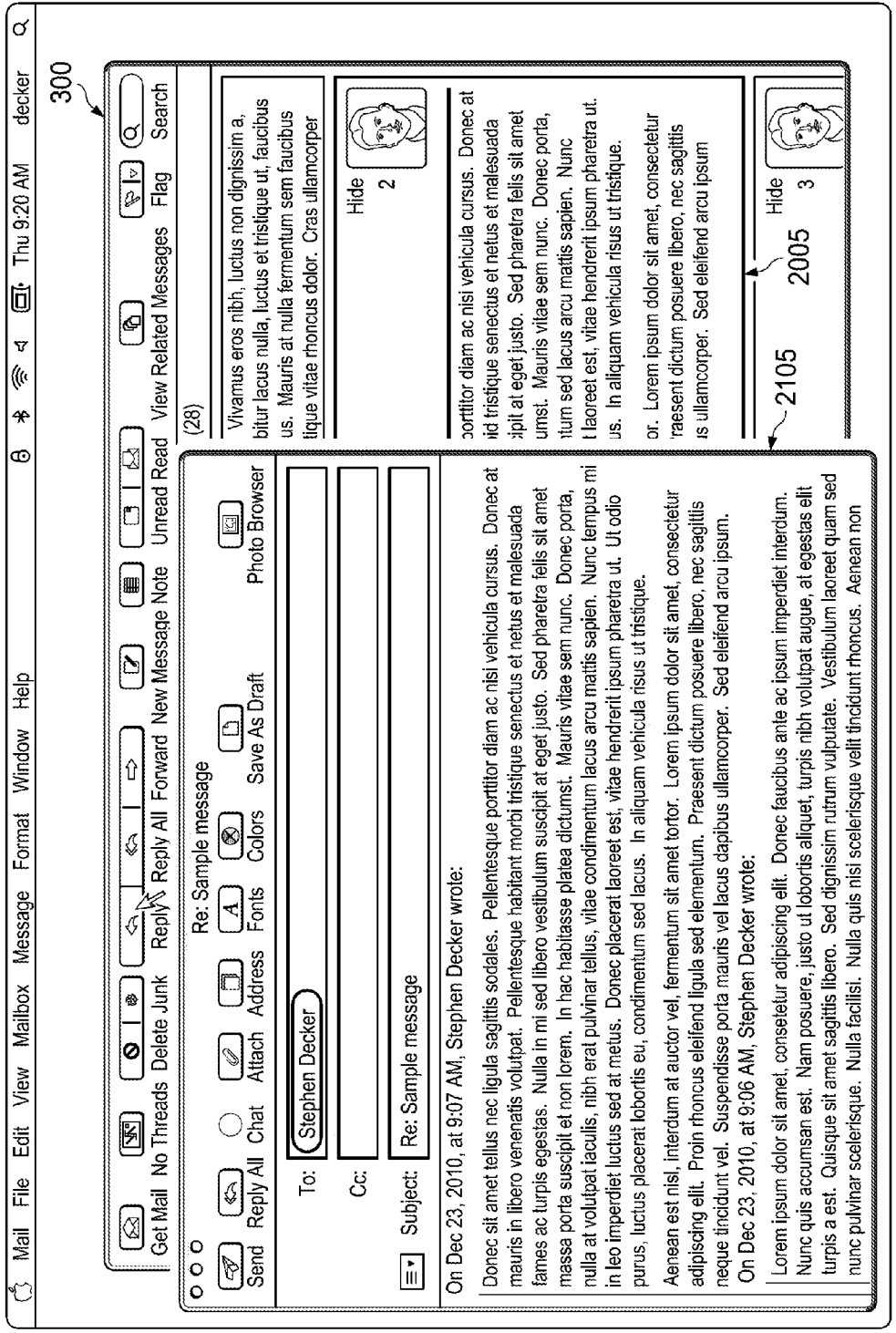

FIGS. 14-19 illustrate an exemplary mail user interface 300 in full screen mode and generation of a composition window 1605 for responding to an existing message 1405 when the existing message 1405 is at least partially off screen. For example, in FIG. 14, the selected message 1405 is completely visible within the mail user interface 300, e.g., neither the header portion 1410 at the top of the selected message 1405 nor the body portion 1415 at the bottom of the selected message 1405 is partially outside of the visible area. In FIG. 15, however, the message pane has been scrolled and the selected message 1405 is partially outside of the visible are of the mail user interface 300. The header 1410 and part of the body 1415 of the selected message 1405 are outside of the visible area of the mail user interface 300. When a reply command 1505 is received, the data processing system 100 generates a composition window 1605 using the slide up animation. For example, FIGS. 16-18 illustrate the exemplary composition window 1605 sliding up from off of the bottom of the screen until it is fully visible. Composition window 1605 is displayed at higher and higher positions within the screen with more and more of the composition window 1605 becoming visible until fully visible in FIG. 19.

For one embodiment, the data processing system 100 uses a threshold of how much of the selected message 1405 is outside of the visible area to result in using the slide up animation rather than the popping out animation for generating a new composition window. For one embodiment, the data processing system 100 uses the slide up animation if any portion of the header 1410 is outside of the visible area. For an alternative embodiment, if any portion of the selected message 1405, e.g., including the body 1415, is outside of the visible area, the slide up animation is used. For yet another alternative, the slide up animation is used when a particular fraction, a number of lines, or another measurable amount of the selected message 1405 or a portion thereof (the header 1410 or body 1415) is outside of the visible area of the mail user interface 300. For another alternate embodiment, the composition window 405 is animated to slide onto the screen from another direction (e.g., the top, left, or right of the screen).

For one embodiment, once composition window 1405 has completed the slide up animation, at block 225, the data processing system 100 sets and maintains focus on the composition window 1405 until the composition window 1405 is closed similar to the composition window 405 described above. At block 230, upon the message being canceled or sent, the composition window 1405 is removed from the display. For one embodiment, the closed composition window 1405 is removed by way of the slide down animation.

If the mail user interface 300 is not in full screen mode, at block 240, the data processing system 100 determines if the selected message 2005 is at least partially outside of the visible area of the mail user interface 300 in a manner similar to the determination described with reference to block 215. If the selected message 2005 is not outside of the visible area of the mail user interface 300, at block 245, the data processing system 100 displays a composition window 2105 using the pop out animation.

FIGS. 20-23 illustrate an exemplary generation of a composition window 2105 using the pop out animation when the mail user interface 300 is not in full screen mode. The mail user interface 300 is not in full screen mode, e.g., when a portion of the desktop is visible next to, above, or below the mail user interface 300. The pop out animation is similar to that described above with reference to FIGS. 3-8.

If the mail user interface is not in full screen mode and the selected message 2005 is at least partially outside of the visible are of the mail user interface 300 (e.g., as described above), at block 250, the data processing system 100 displays an ordinary pop up composition window when a reply or forward command is received for the selected message 2005.

For an alternate embodiment, one or more blocks of method 200 are omitted or interchangeable with similar features. For example, the data processing system 100 determines that the mail user interface is in full screen mode at block 210 and the data processing system maintains focus on the composition window until receiving a close or send command at block 225, regardless of how the composition window is displayed and removed. As a further example, the data processing system 100 determines if the selected message is at least partially outside of the visible area of the mail user interface at block 215 and, as a result, displays a composition window using the pop out animation at block 220 or using the slide up animation at block 235, regardless of whether or not the mail user interface is in full screen mode.

Figure 24:
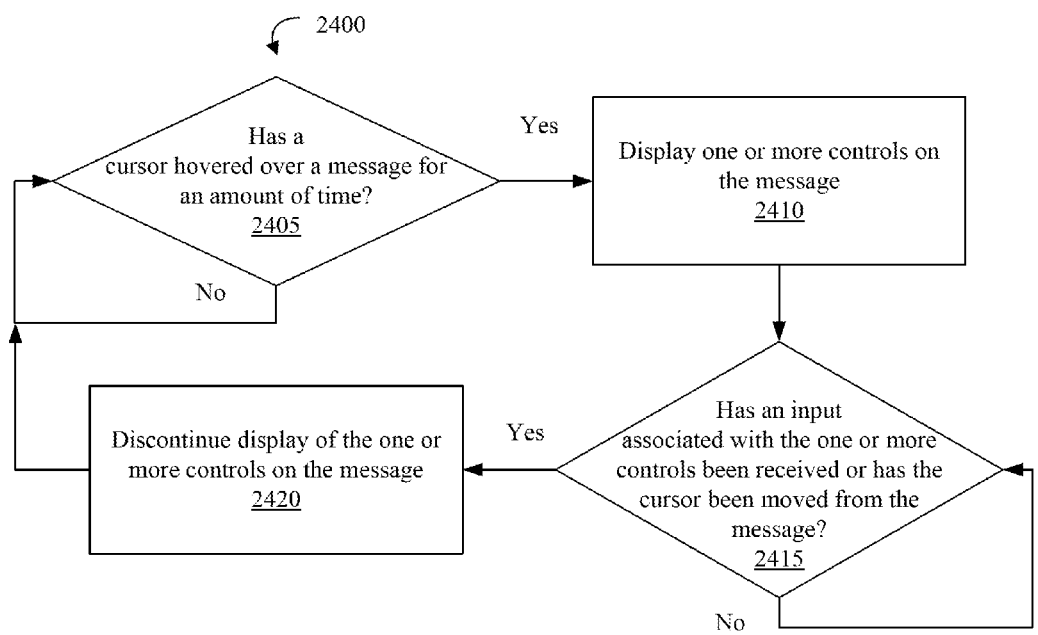
FIG. 24 is a flow chart that illustrates an exemplary method of dynamically displaying controls for a message in a mail user interface.
Figure 25:
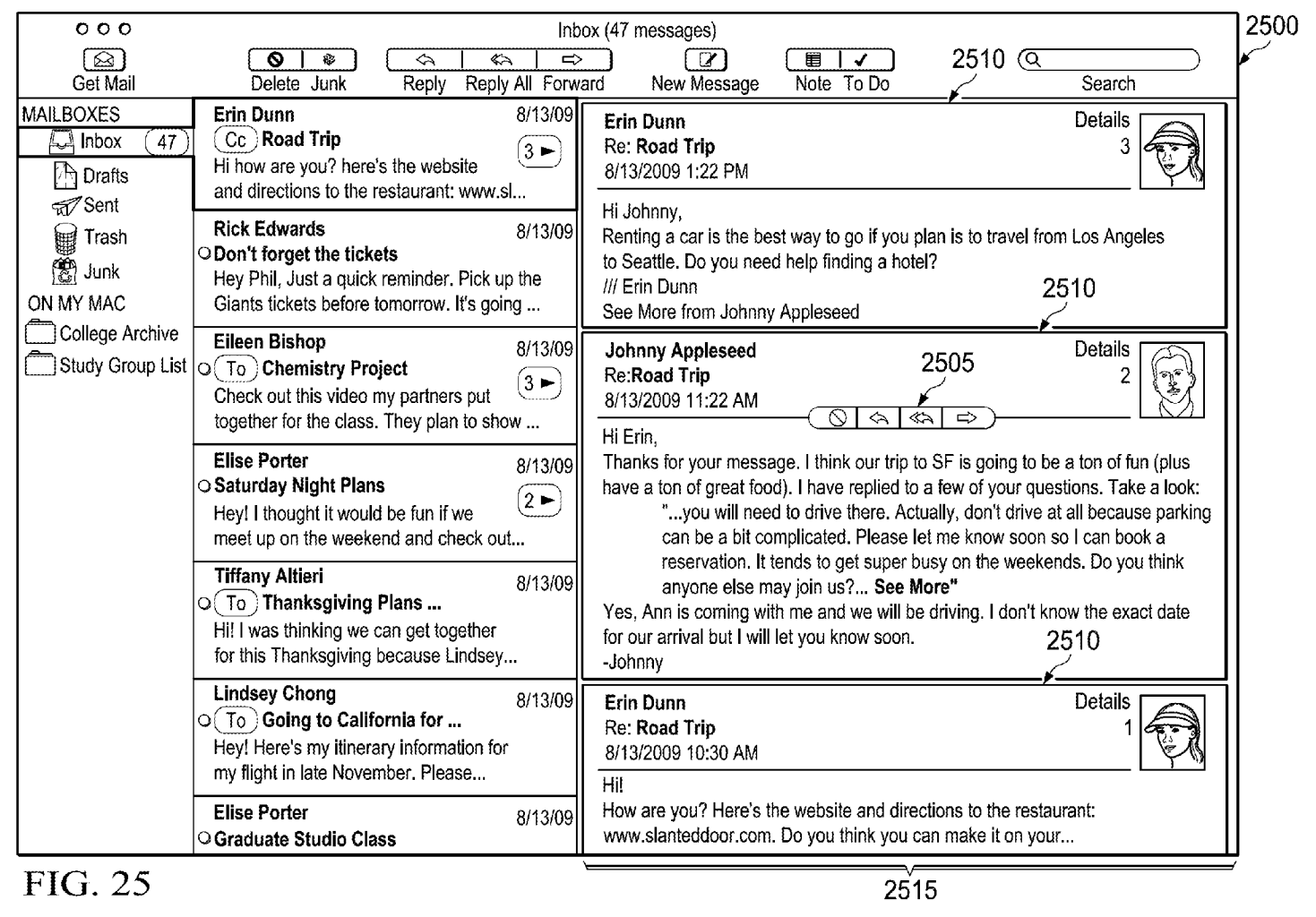

FIG. 24 is a flow chart that illustrates an exemplary method 2400 of dynamically displaying controls for a message in a mail user interface. FIG. 25 illustrates an exemplary mail user interface 2500 displaying the dynamically generated controls 2505. At block 2405, the data processing system 100 determines if a cursor (e.g., a mouse cursor) has hovered over a message 2510 in a message panel 2515 of the mail user interface 2500 for an amount of time. For one embodiment, a predetermined amount of time, such as a matter of seconds, is used as the threshold for the determination. If a cursor has not hovered over a message 2510 for the amount of time, the data processing system 100 continues to wait at block 2405 until a hovered over a message 2510 in a message panel 2515 of the mail user interface 2500 for an amount of time. If the cursor has hovered over a message 2510 for the amount of time, at block 2410, the data processing system displays a set of one or more controls 2505 on the message 2510. Exemplary controls 2505 dynamically displayed on a message 2510 include delete, reply, reply to all, and forward. Alternatively, other controls to manipulate the message 2510 may be included (e.g., move to a file, mark as unread, block sender, flag, etc.). At block 2415, the data processing system 100 continues to display the one or more controls 2505 until the data processing system 100 receives an input associated with one of the controls 2505 or until the cursor is moved from the message 2510. If the data processing system 100 receives an input associated with one of the controls 2505 or the cursor is moved from the message 2510, at block 2420, the data processing system discontinues the display of the one or more controls 2505 on the message 2510.

Figure 26:
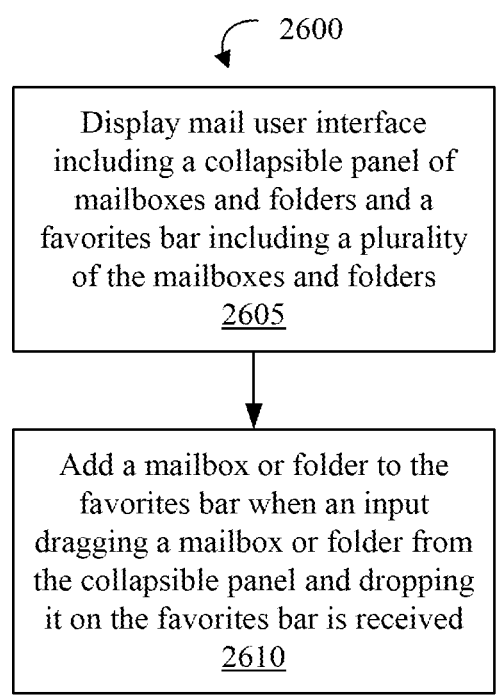
FIG. 26 is a flow chart that illustrates an exemplary method of adding a folder or mailbox to a favorites bar in a mail user interface.
Figure 27:
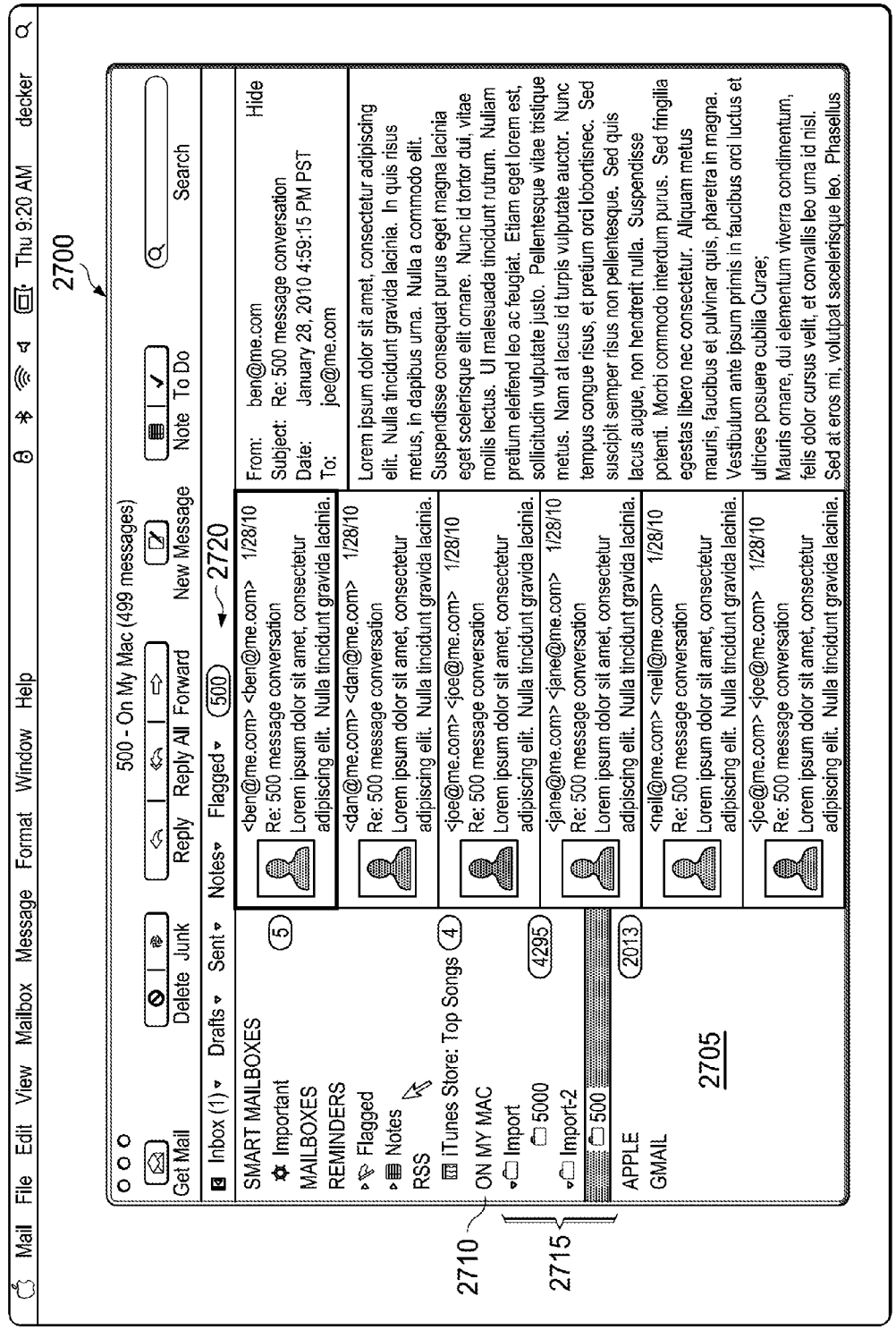
FIGS. 27-31 illustrate the addition of a folder or mailbox to a favorites bar by drag and drop in an exemplary mail user interface.

FIG. 26 is a flow chart that illustrates an exemplary method 2600 of adding a folder or mailbox to a favorites bar in a mail user interface. FIGS. 27-31 illustrate adding a folder or mailbox 2710 to a favorites bar 2720 in an exemplary mail user interface 2700. At block 2605, the data processing system 100 displays an email user interface 2700 including a collapsible panel 2705 of mailboxes and folders and a favorites bar 2720 including a plurality of the mailboxes and folders. For one embodiment, the favorites bar 2720 is displayed separately from and independently of whether or not the collapsible panel 2705 is collapsed.

At block 2610, a mailbox or folder 2710 is added to the favorites bar by dragging the mailbox or folder 2710 from the collapsible panel 2705 of mailboxes and dropped on the favorites bar 2720. For one embodiment, one of the plurality of mailboxes and folders in the favorites bar 2720 is a hierarchical folder that includes one or more subfolders that is accessible via a drop down menu from the hierarchical folder in the favorites bar 2720. For example, subfolders of a hierarchical folder in the favorites bar 2720 are accessed by way of clicking the hierarchical folder, or an icon next to it, in the favorites bar 2720, by way of a "spring-loaded" opening (described further below), etc.

Figure 28:
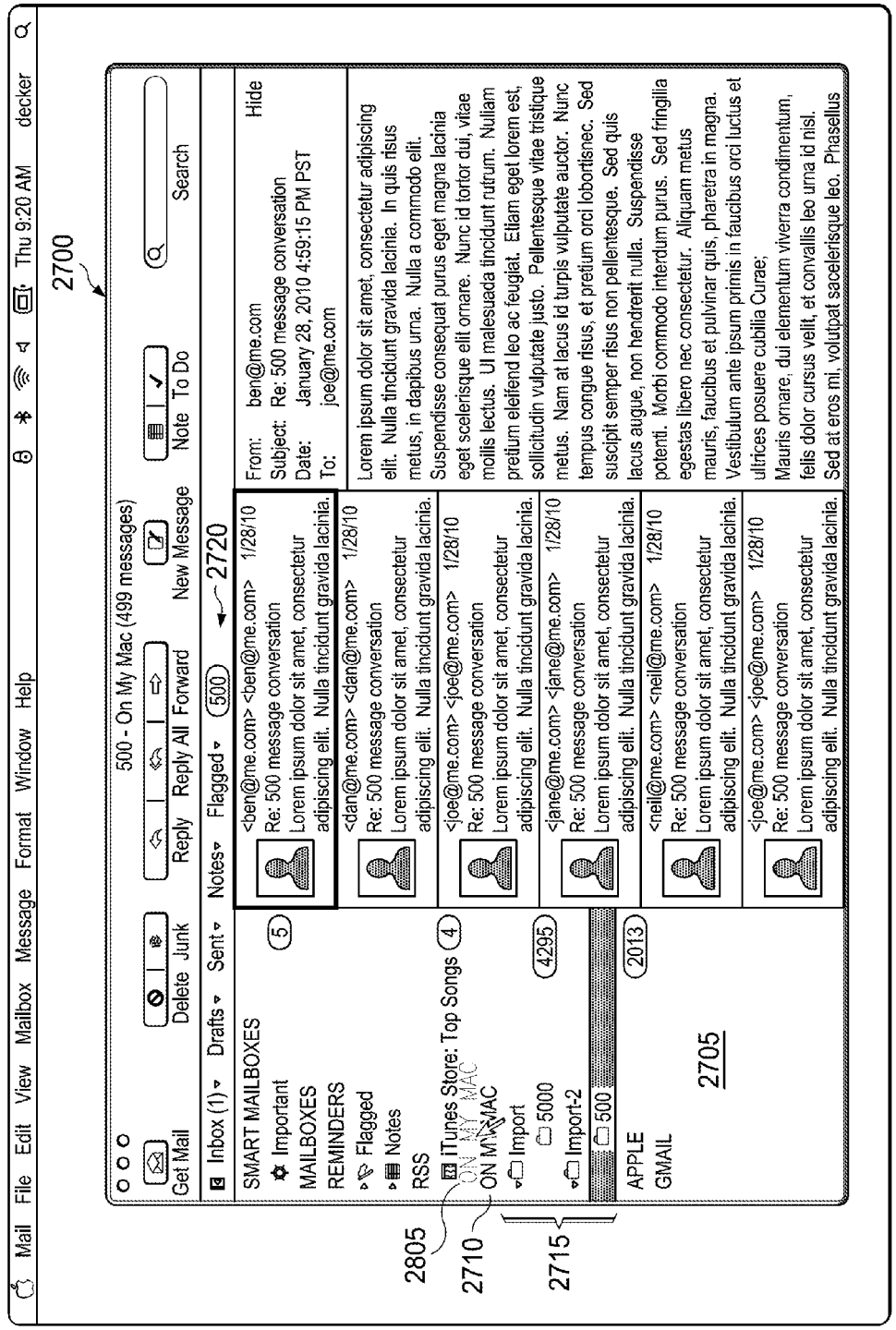
Figure 29:
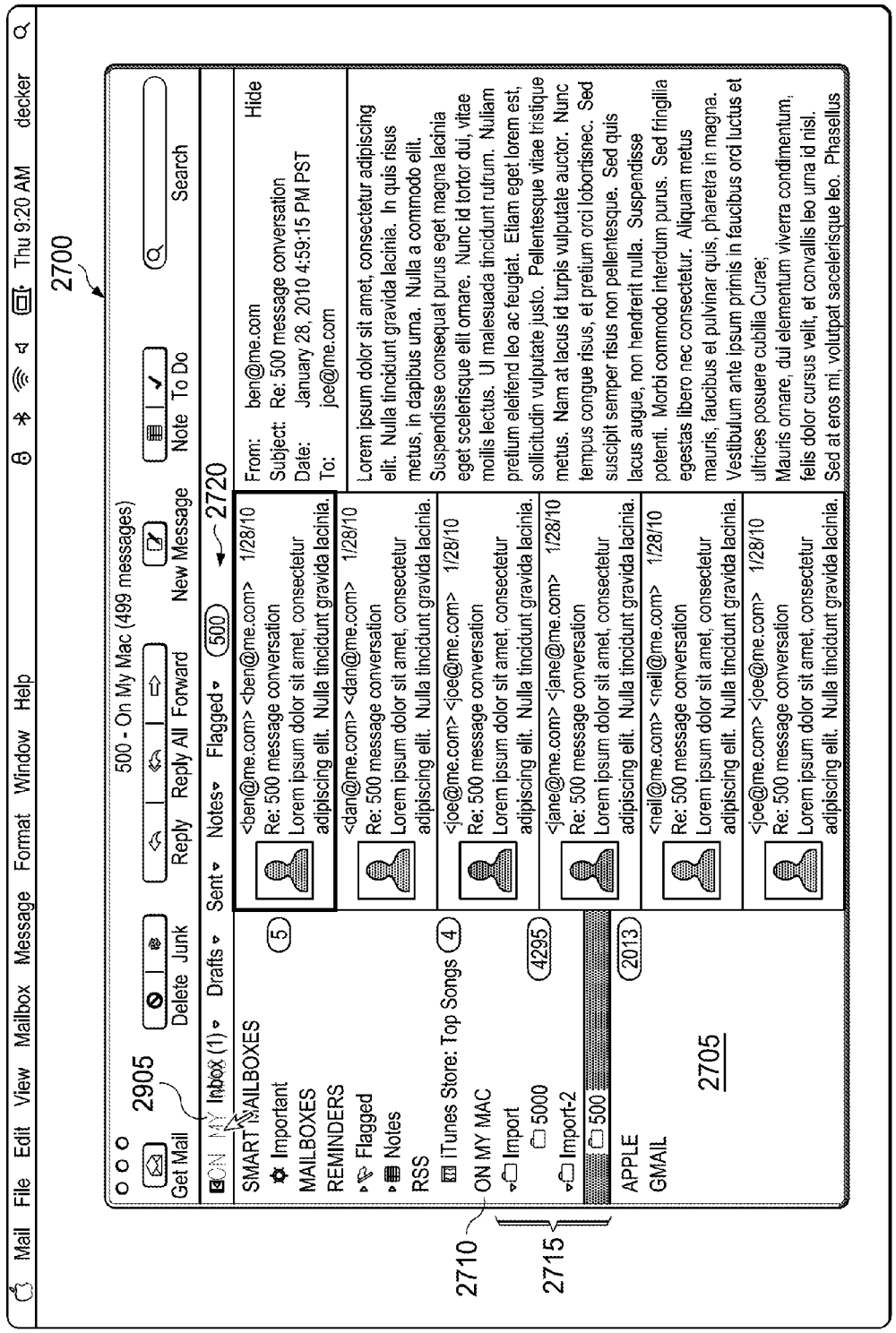
Figure 30:
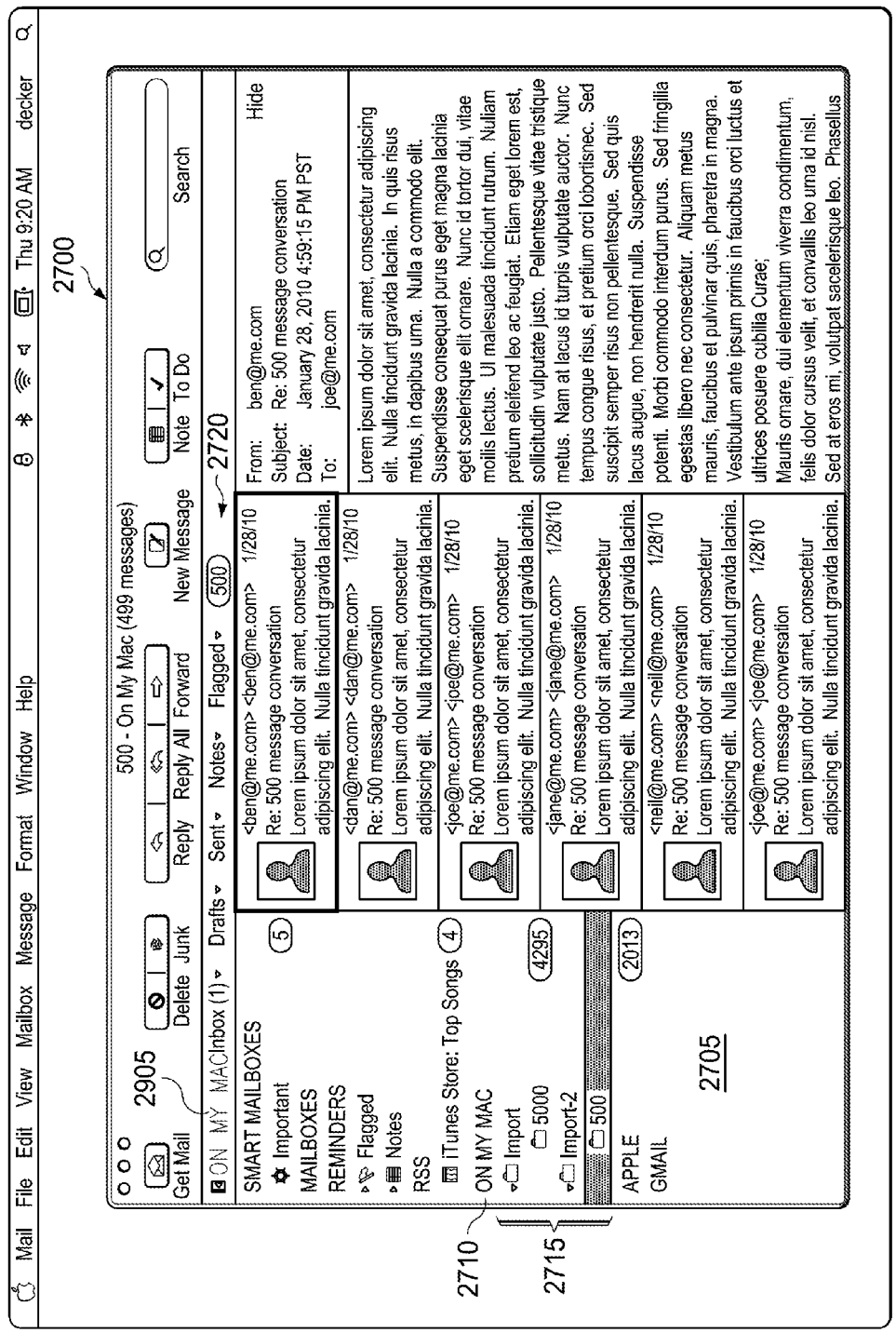
Figure 31:
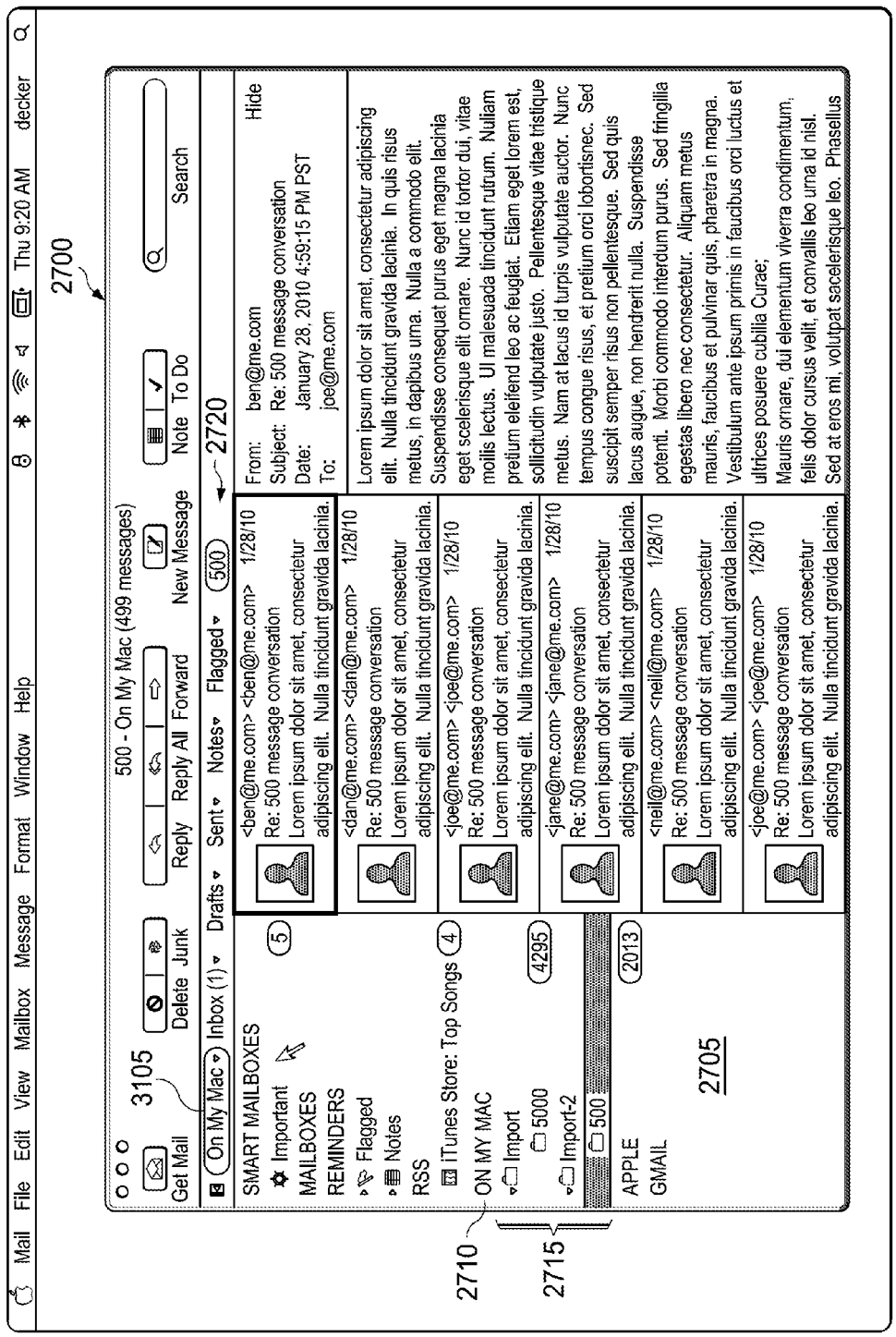

FIG. 28 illustrates that a mailbox or folder 2710 and is being drug (illustrated by a translucent copy 2805) towards the favorites bar 2720. The mailbox or folder 2710 is a hierarchical folder and includes subfolders 2715. FIGS. 29 and 30 illustrate the data processing system 100 rearranging the current layout of mailboxes and/or folders in the favorites bar 2720 when the translucent copy 2805 of the mailbox or folder 2710 is held above a portion of the favorites bar 2720. For example, if the translucent copy 2805 is held over a location of the favorites bar 2720 that displays a mailbox or folder, that mailbox or folder shifts to the right or left in anticipation of the translucent copy 2805 being dropped onto the favorites bar 2720 and creating an empty space 2905. For one embodiment, the shifting of one mailbox or folder in the favorites bar 2720 causes one or more additional mailboxes or folders in the favorites bar 2720 to also shift in the same direction. For an alternate embodiment, one or more mailboxes or folders in the favorites bar 2720 are shifted at the time or after, rather than before, the translucent copy 2805 is dropped on the favorites bar 2720. FIG. 31 illustrates a copy of the mailbox or folder 3105 in the favorites bar 2720 after the translucent copy 2805 has been dropped onto the favorites bar 2720.

Figure 32:
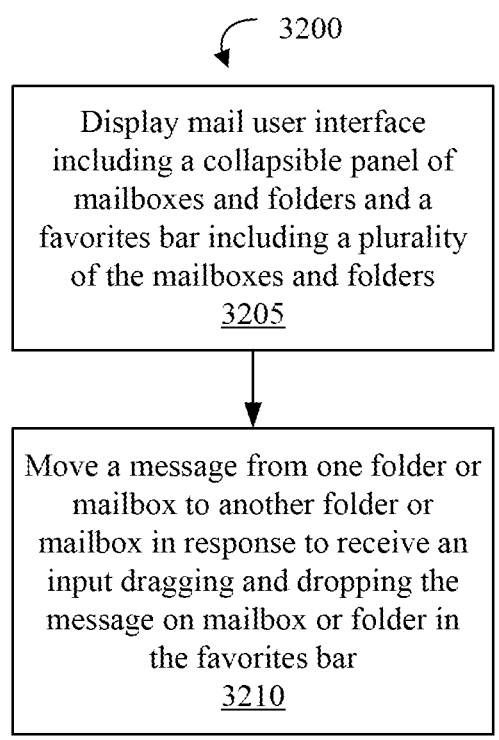
FIG. 32 is a flow chart that illustrates an exemplary method of dragging a message from one folder or mailbox to another folder or mailbox on the favorites bar in a mail user interface.
Figure 33:
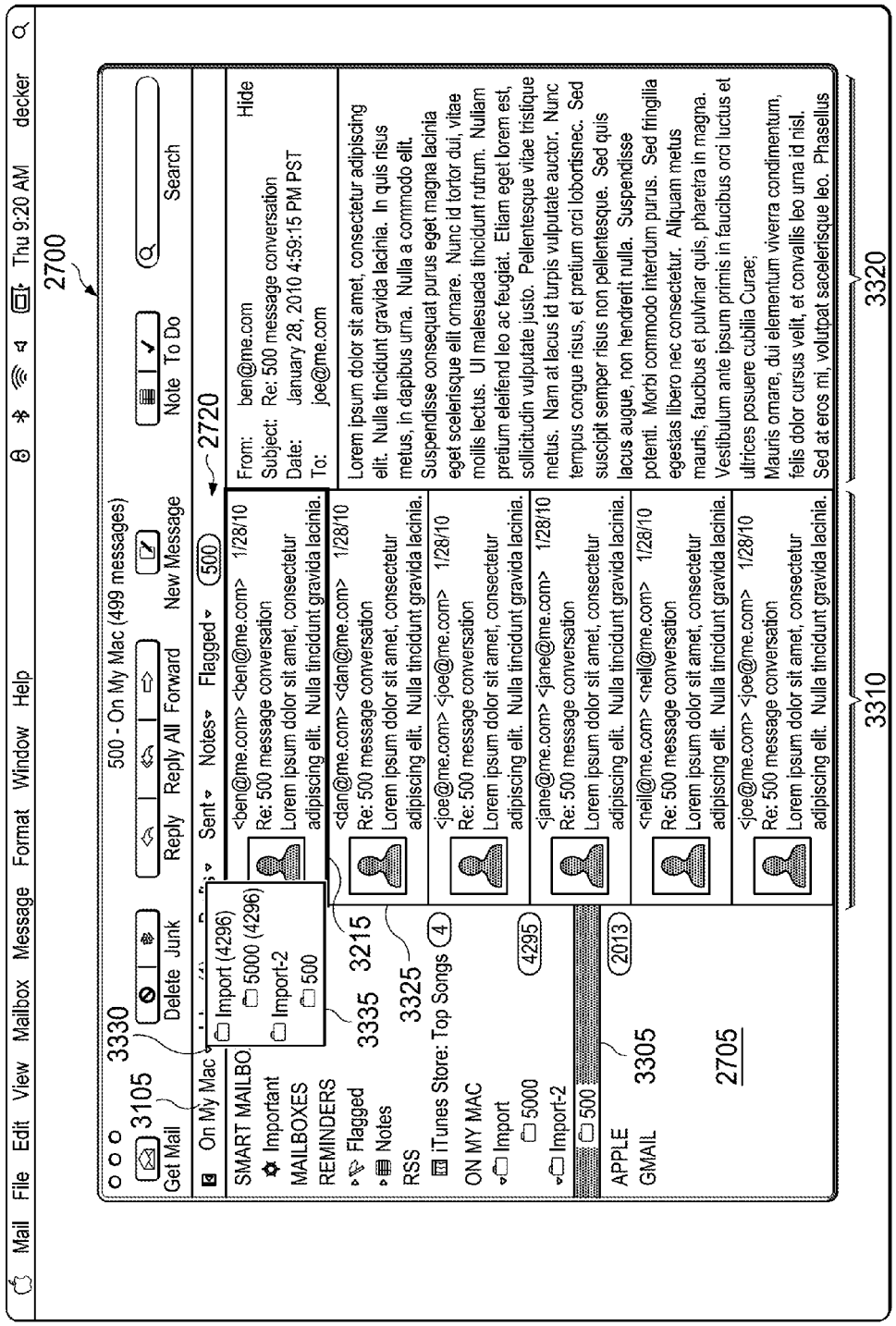
FIGS. 33-38 illustrate dragging a message from one folder or mailbox to another folder or mailbox on the favorites bar in an exemplary mail user interface.

FIG. 32 is a flow chart that illustrates an exemplary method 3200 of dragging a message from one folder or mailbox to another folder or mailbox on the favorites bar in a mail user interface. FIGS. 33-38 illustrate dragging a message 3325 from one folder or mailbox 3305 to another folder or mailbox 3705 on the favorites bar 2720 in an exemplary mail user interface 2700. At block 3205, the data processing system 100 displays an email user interface 2700 including a collapsible panel 2705 of mailboxes and folders and a favorites bar 2720 including a plurality of the mailboxes and folders. The exemplary mail user interface 2700 includes collapsible panel 2705 of mailboxes and folders, a preview panel 3310 listing and providing previews for messages stored within a selected mailbox or folder 3305, and a message panel 3320 displaying a selected message 3315. The recently added mailbox or folder 3105 is included in the favorites bar 2720. For one embodiment, an icon 3330 is displayed next to a mailbox or folder 3105 in the favorites bar 2720 to illustrate that the mailbox or folder 3105 is a hierarchical folder and includes subfolders 3335. For one embodiment, clicking on the icon 3330 results in a drop down menu of the subfolders 3335.

Figure 34:
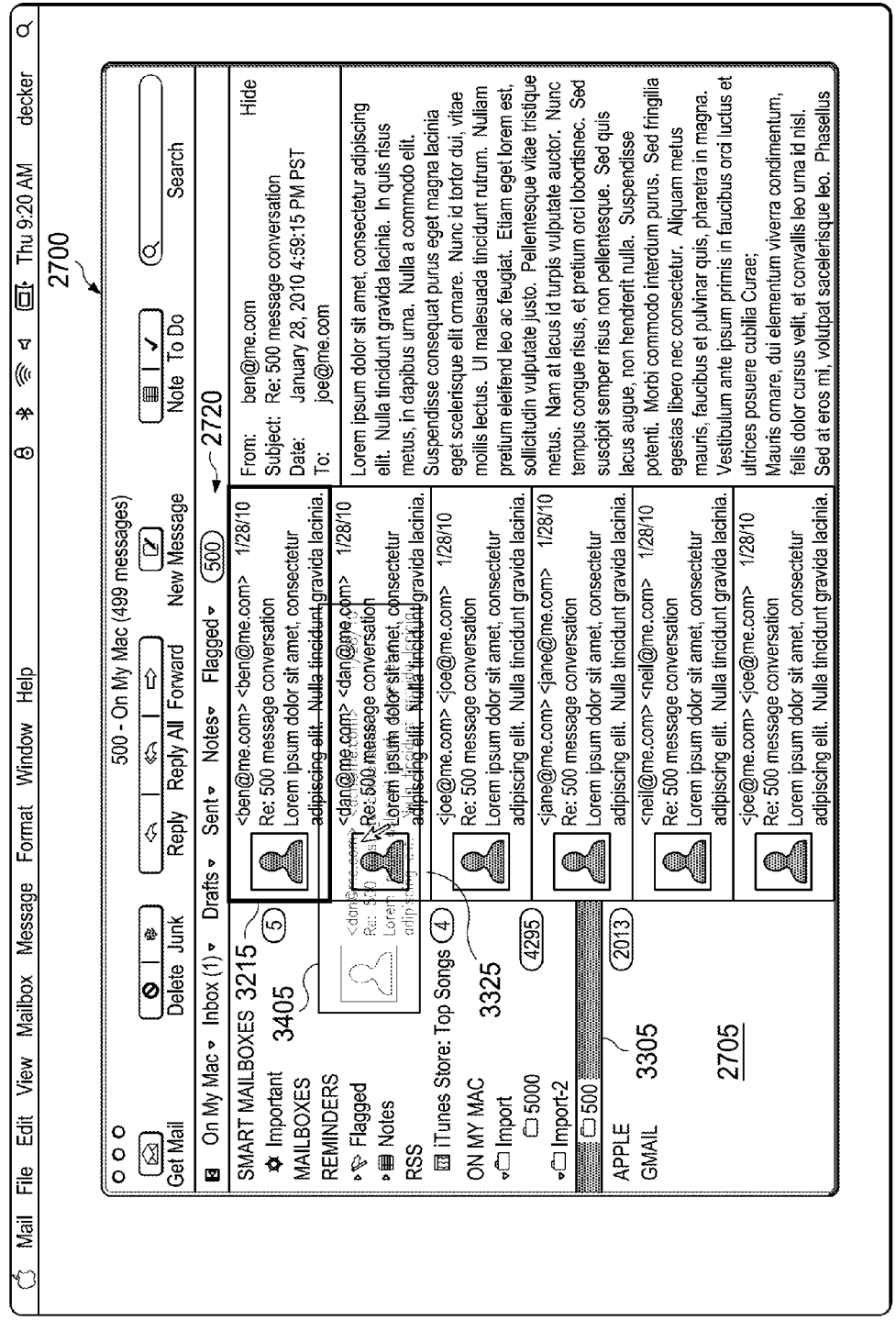
Figure 35:
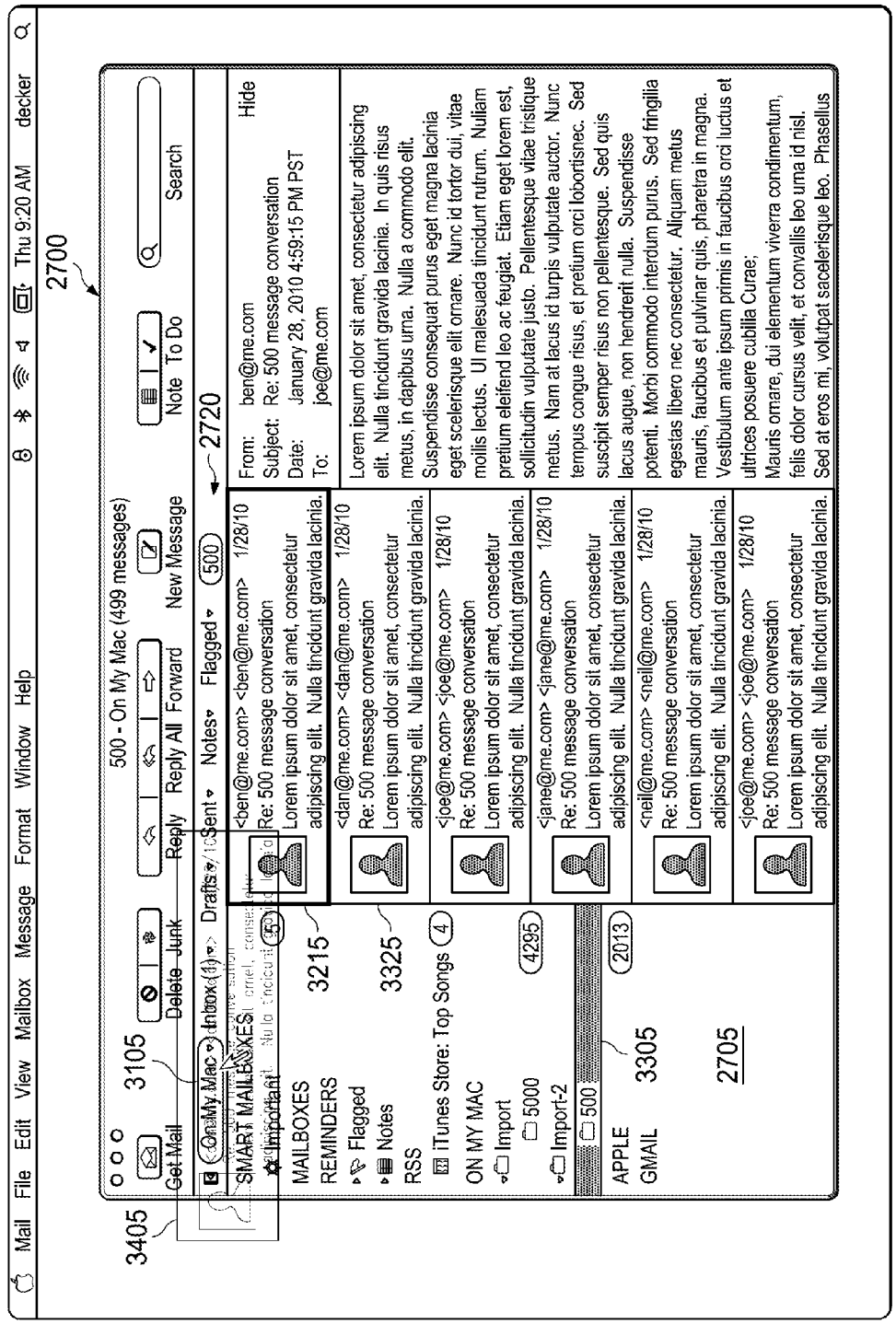
Figure 36:
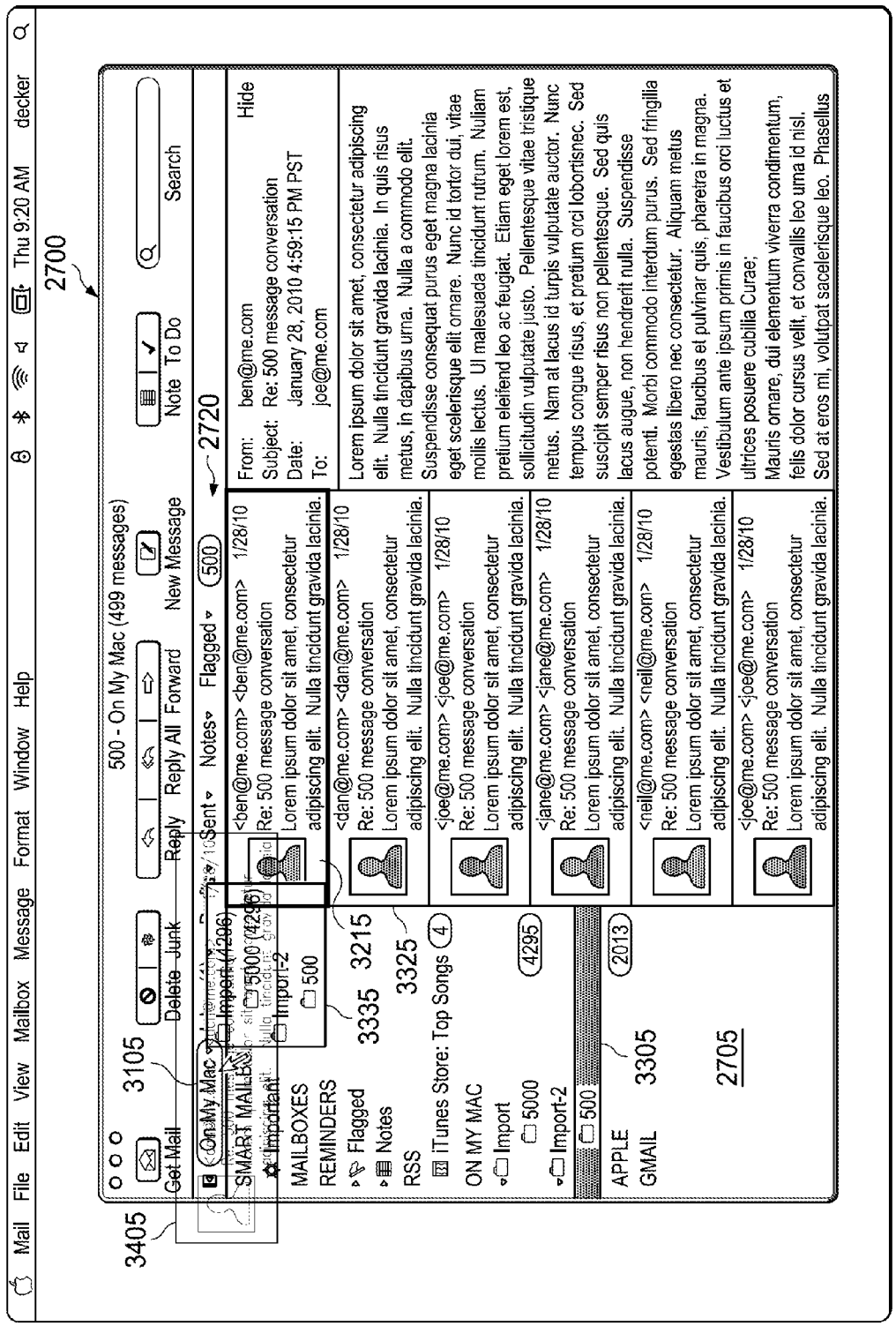
Figure 37:
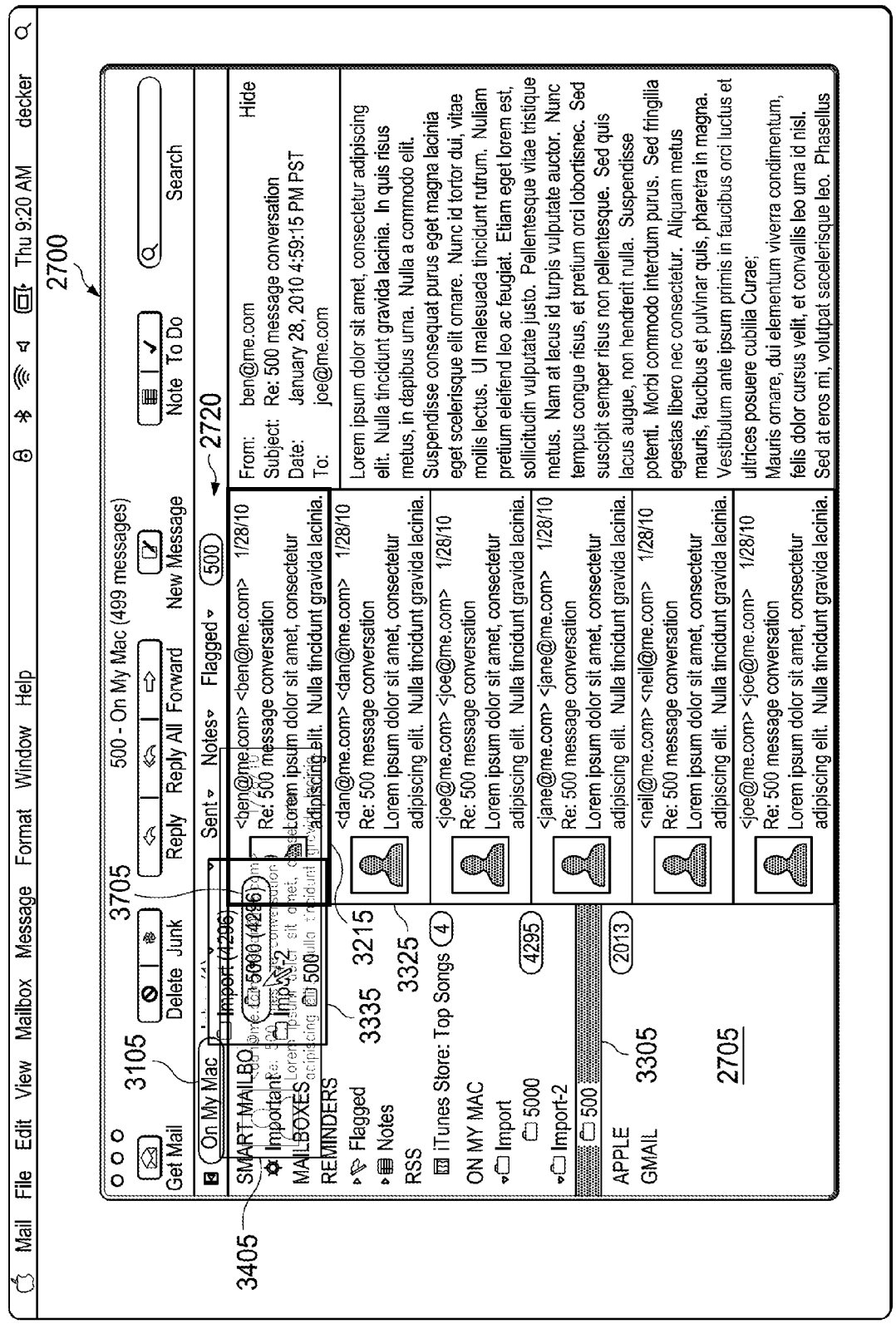
Figure 38:
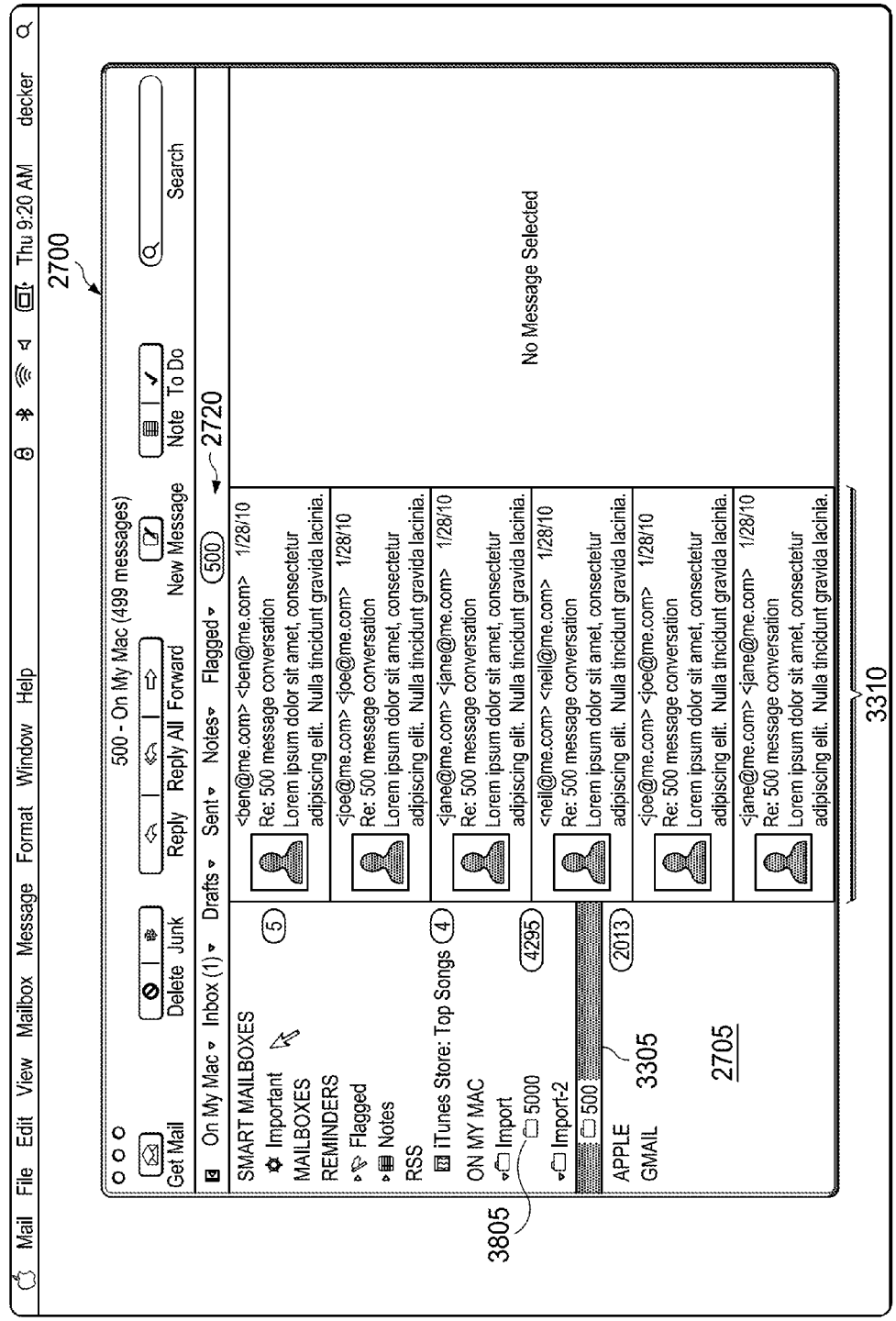

At block 3210, a drag and drop input is received to move a message 3325 from the currently displayed mailbox or folder 3305 to another mailbox or folder on the favorites bar 2720. For example, as illustrated in FIG. 34, dragging a message 3325 results in a translucent copy 3405 moving across the display. For one embodiment, hovering the translucent copy 3405 above a mailbox or folder 3105 (for simplicity also interchangeably referred to as folder 3105) on the favorites bar 2720 results in the folder 3105 being highlighted as illustrated in FIG. 35. If the translucent copy 3405 is dropped on the folder 3105, the message 3325 is moved from its current folder 3205 to the new folder 3105. If the folder 3105 is a hierarchical folder, for one embodiment, hovering the translucent copy 3405 above a hierarchical folder 3105 on the favorites bar 2720 results in an automatic (or "spring-loaded") opening of a drop down listing of the subfolders 3335 for the folder 3105. The translucent copy 3405 may then be dragged and dropped into a subfolder 3705 as illustrated in FIG. 37. Once the message 3325 has been dragged and dropped into a folder 3105 or subfolder 3705 in the favorites bar 2720, the message 3325 is moved and no longer displayed in the current folder 3205, as illustrated in FIG. 38. For example, in FIG. 38, the message 3325 is no longer displayed in the preview panel 3310. Should the mailbox or folder 3705/3805 be selected in the collapsible panel 2705 or in the favorites bar 2720, the message 3325 will be displayed in its new location.

For one embodiment, the data processing system 100 will move a selected message from one mailbox or folder to another mailbox or folder in the favorites bar 2720 in response to receiving a keyboard shortcut input. For example, each mailbox or folder in the favorites bar 2720 may be assigned a number and a keyboard shortcut using said number will move the selected message to the corresponding mailbox or folder. For example, if mailboxes and folders from left to right in the favorites bar 2720 were numbered 1, 2, 3, etc., the keyboard shortcuts Cmd-Ctrl-1 (the combination of Command, Control, and 1 keys all being pressed), Cmd-2, Cmd-3, etc. would cause the data processing system 100 to move the selected message to the mailbox or folder in the favorites bar 2720 corresponding to the number in the keyboard shortcut command.

For one embodiment, the data processing system 100 provides a visual representation of the move of a selected message to a mailbox or folder in the favorites bar 2720 when executed in response to a keyboard shortcut. For example, the data processing system 100 displays, similar to the drag and drop described above and illustrated in FIGS. 33-38, a translucent copy of the selected message preview, or an icon or other visual representation of the selected message, moving from the location of the selected message to the mailbox or folder in the favorites bar 2720 that corresponds to the keyboard shortcut.

Figure 39:
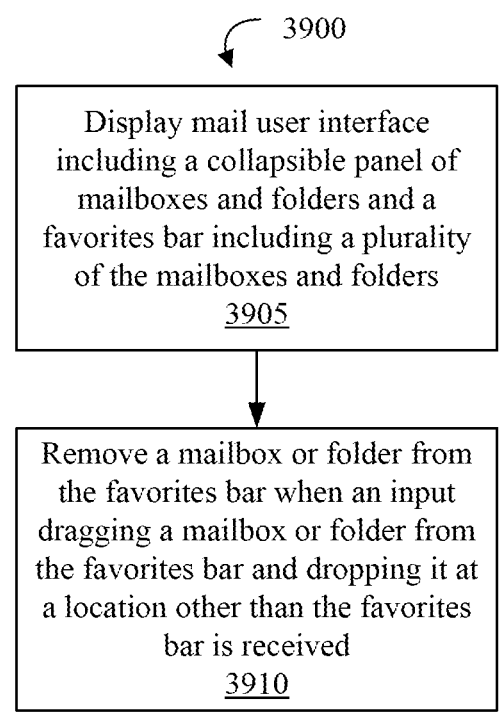
FIG. 39 is a flow chart that illustrates an exemplary method of removing a folder or mailbox from a favorites bar in a mail user interface.
Figure 40:
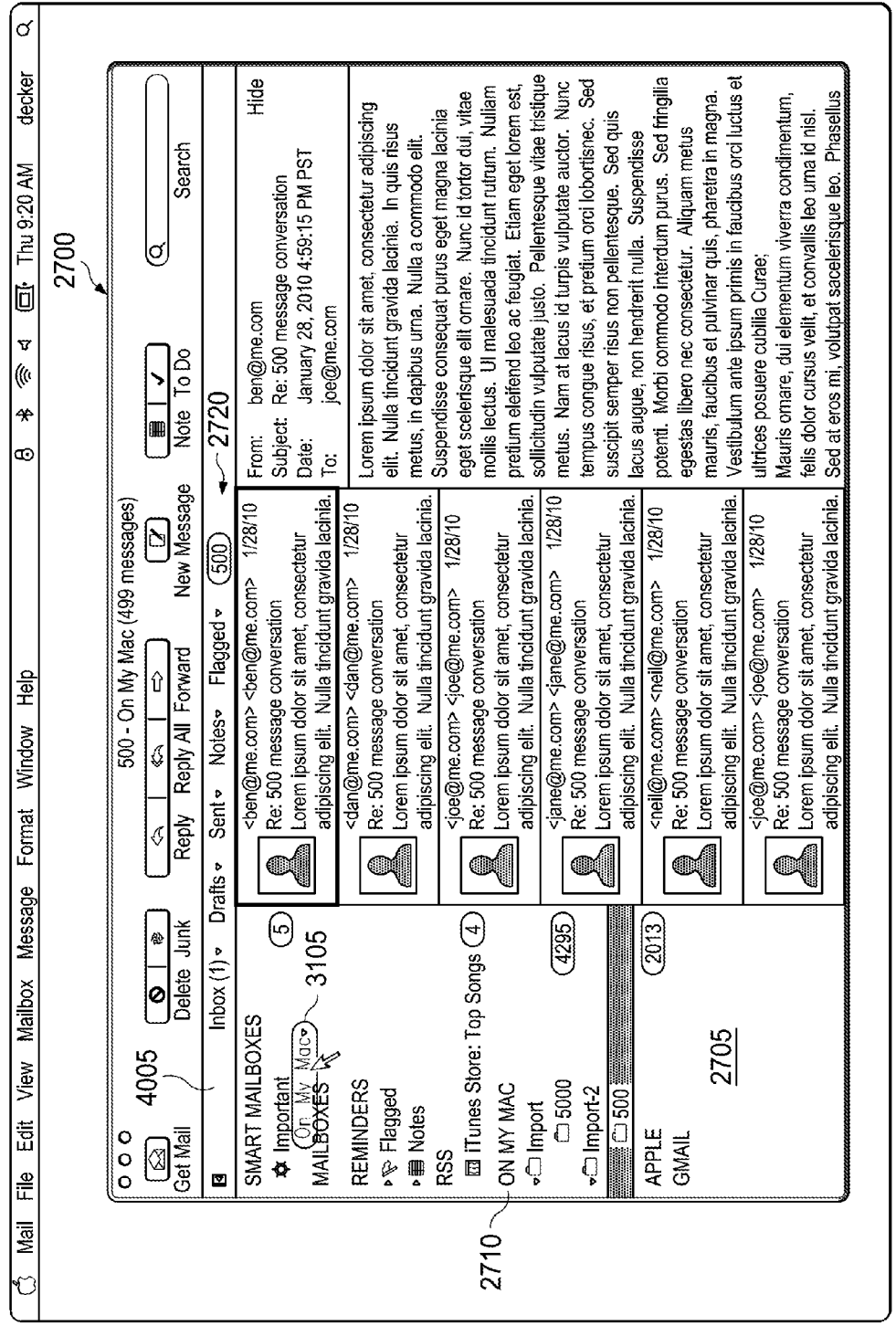
FIGS. 40-45 illustrate removing a folder or mailbox from a favorites bar in an exemplary mail user interface.
Figure 41:
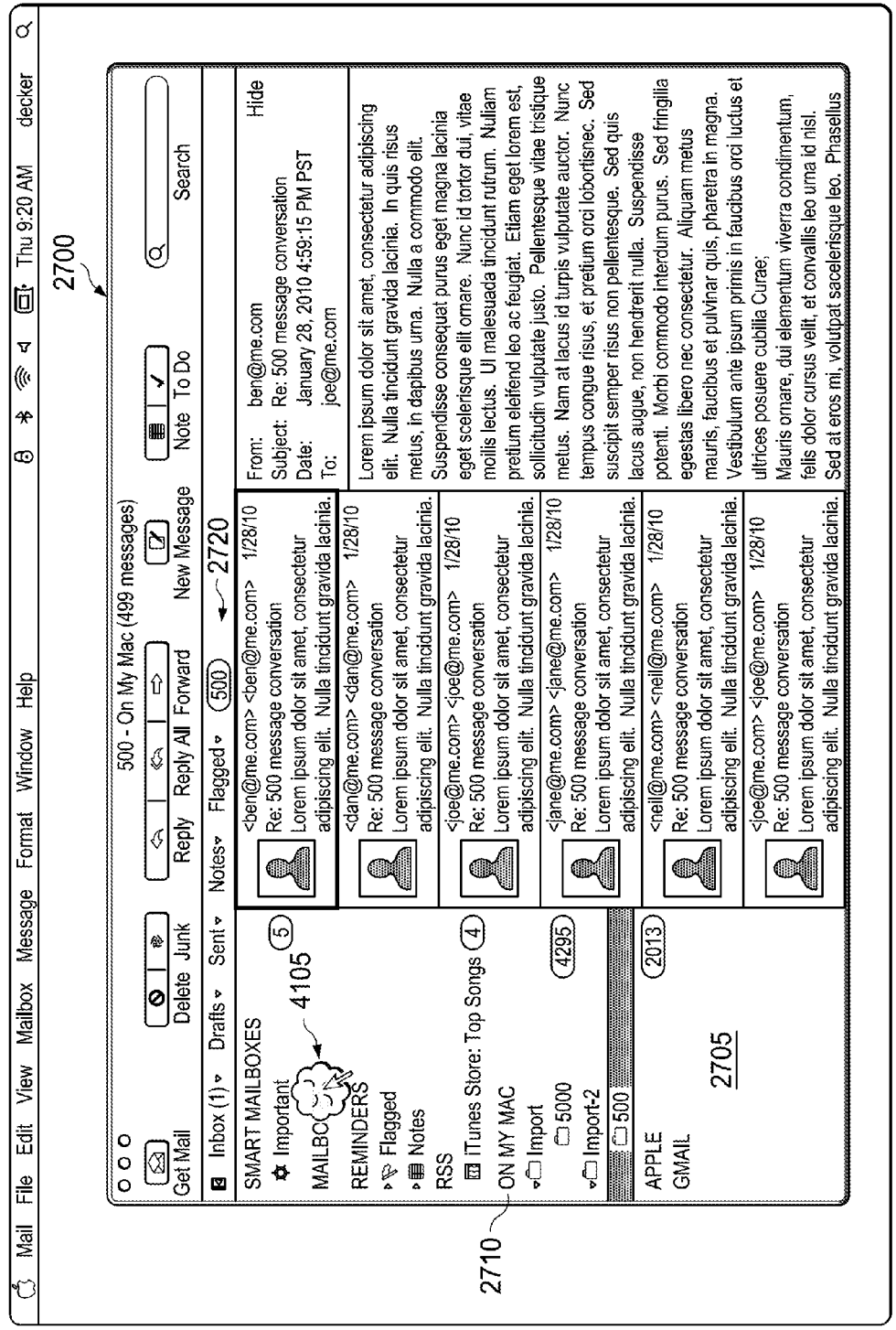
Figure 42:
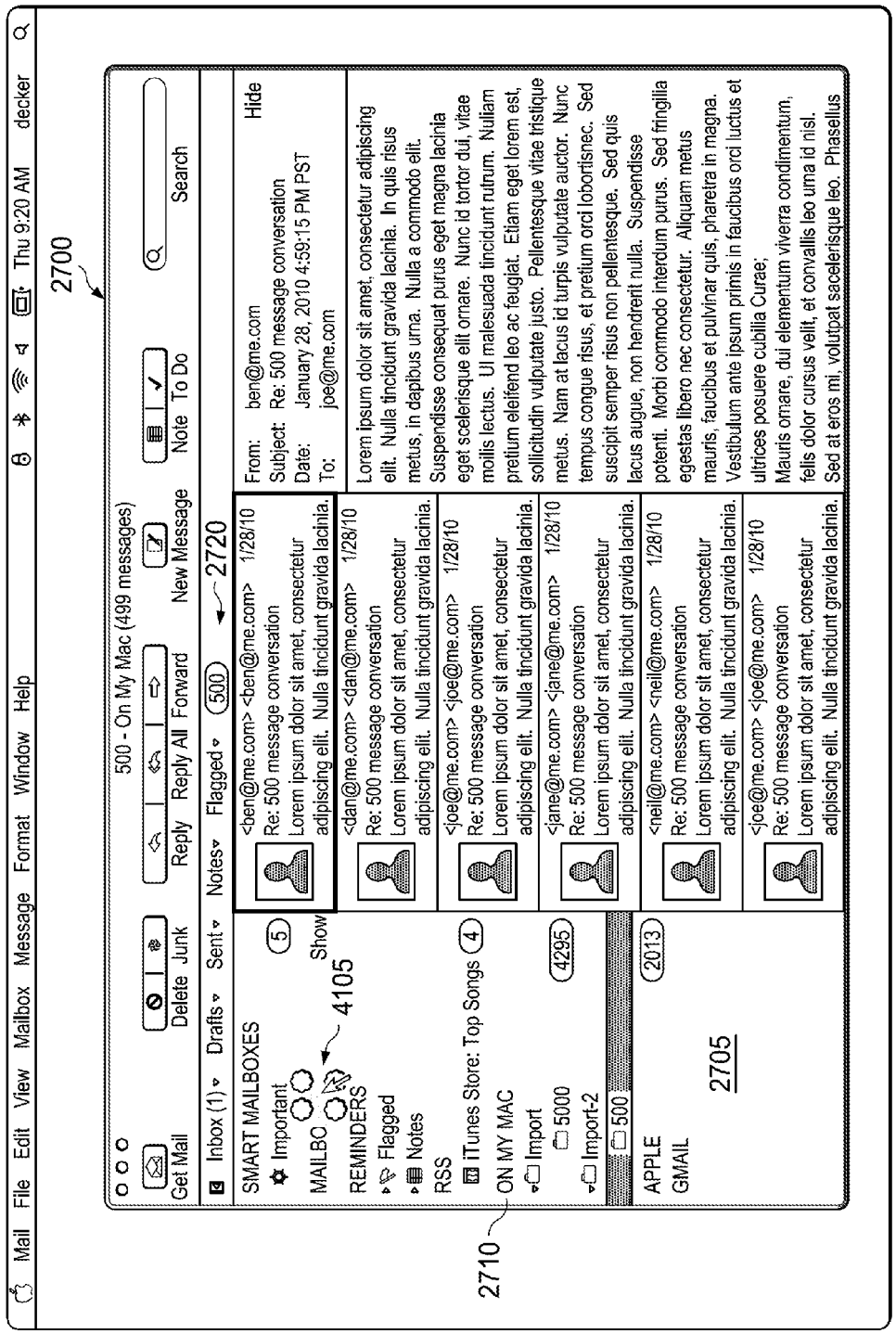
Figure 43:
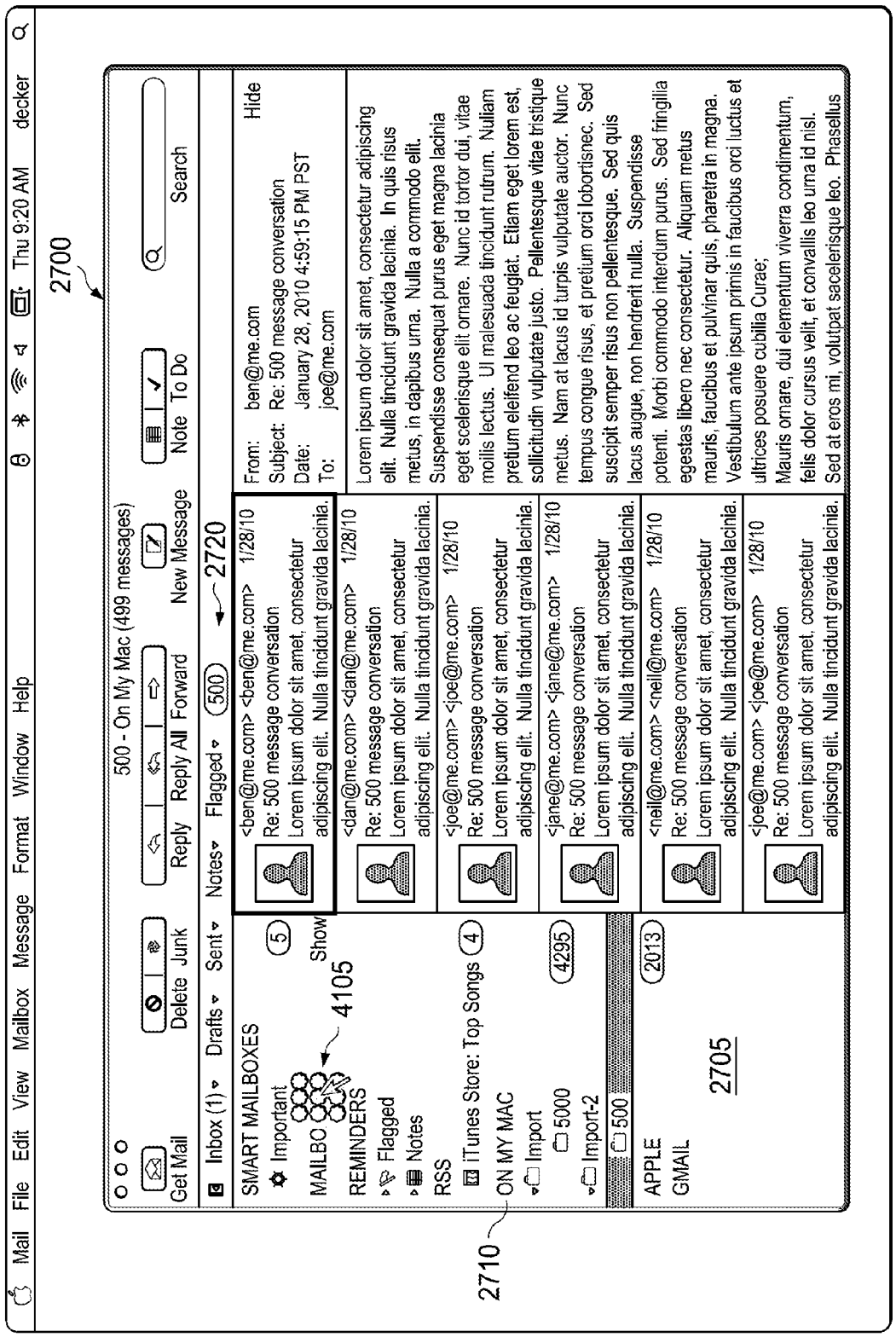
Figure 44:
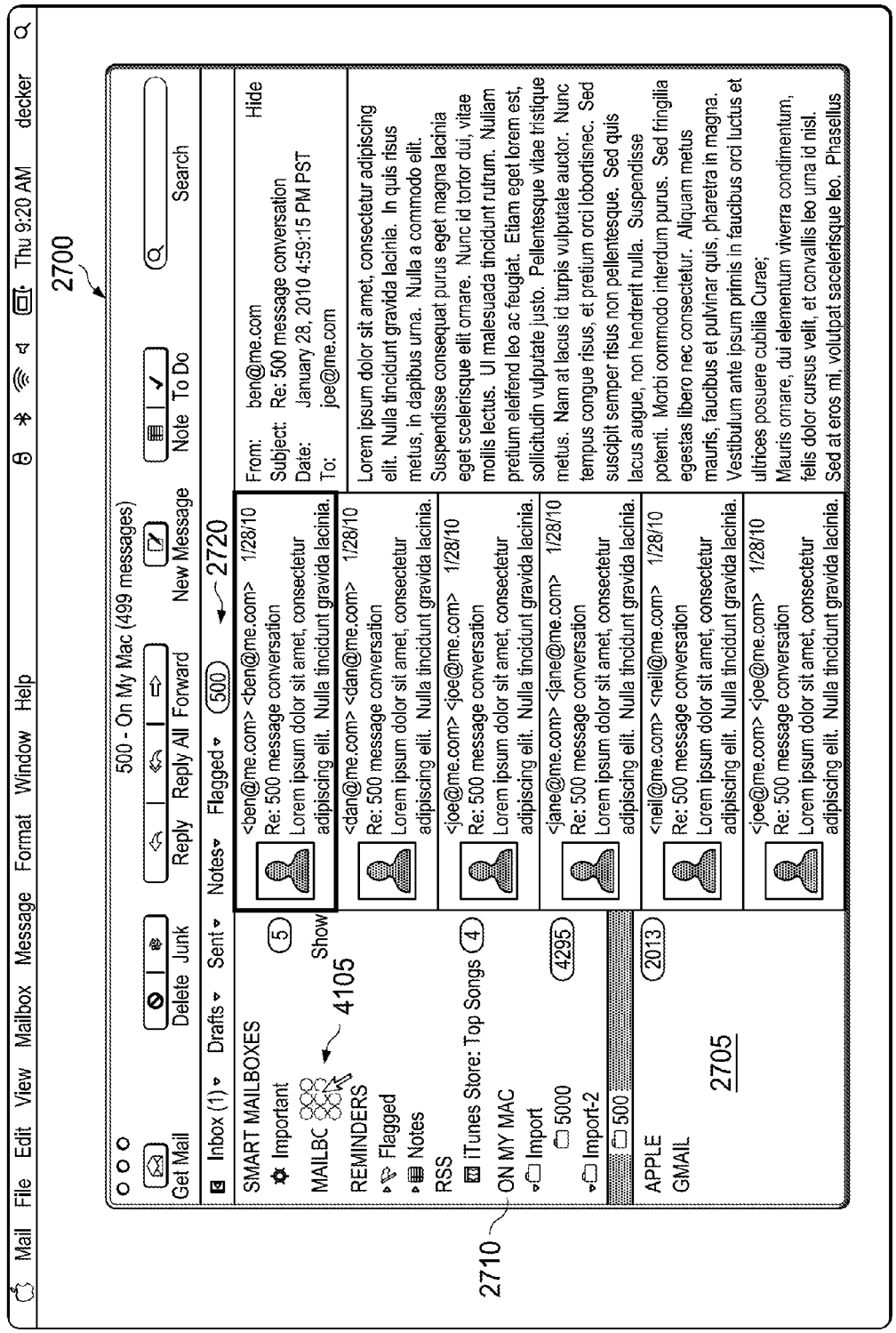
Figure 45:
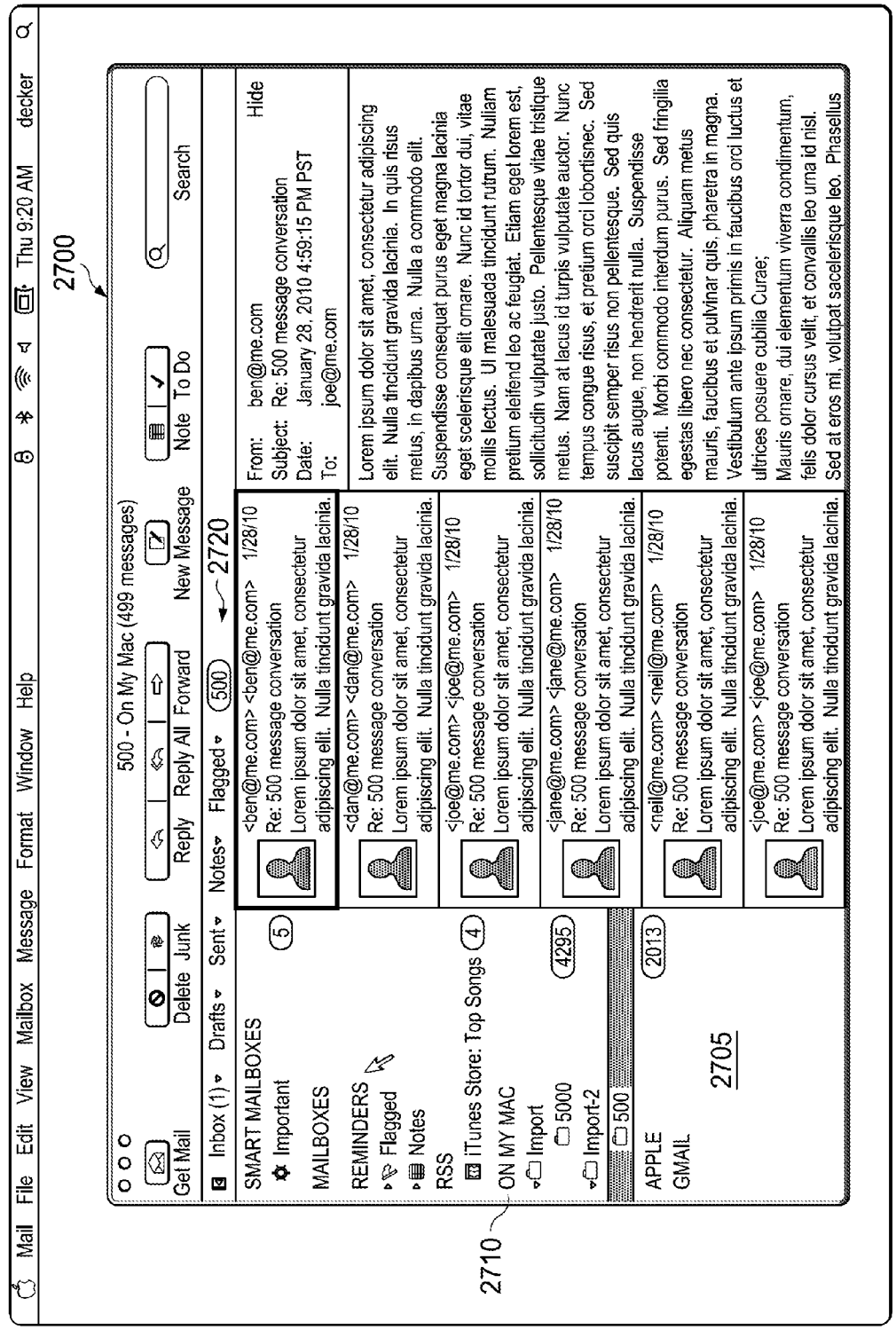

FIG. 39 is a flow chart that illustrates an exemplary method 3900 of removing a folder or mailbox from a favorites bar in a mail user interface. FIGS. 40-45 illustrate removing a folder or mailbox from a favorites bar in an exemplary mail user interface. At block 3905, the data processing system 100 displays an email user interface 2700 including a collapsible panel 2705 of mailboxes and folders and a favorites bar 2720 including a plurality of the mailboxes and folders. At block 3910, the data processing system 100 removes a mailbox or folder 3105 from the favorites bar 2720 when an input dragging the mailbox or folder 3105 from the favorites bar 2720 and dropping it at a location other than the favorites bar 2720 is received. For example, FIG. 40 illustrates the mailbox or folder 3105 in the process of being dragged from the favorites bar 2720. An empty space 4005, is temporarily displayed in the favorites bar 2720 where the mailbox or folder 3105 once was displayed. For one embodiment, when the mailbox or folder 3105 is dragged at a location other than the favorites bar 2720, a remaining mailbox or folder on the favorites bar 2720 shifts to the right or left in anticipation of the mailbox or folder 3105 being dropped off of the favorites bar 2720 to fill the empty space 4005. For one embodiment, the shifting of the remaining mailbox or folder in the favorites bar 2720 causes one or more additional mailboxes or folders in the favorites bar 2720 to also shift in the same direction. For an alternate embodiment, one or more mailboxes or folders in the favorites bar 2720 are shifted at the time or after, rather than before, the mailbox or folder 3105 is dropped off of the favorites bar 2720. For one embodiment, when the mailbox or folder 3105 is dropped in a location other than the favorites bar 2720, it disappears by way of an animation of a dissipating cloud of smoke 4105 as illustrated in FIGS. 41-45 and no longer appears in the favorites bar 2720. Alternatively, when the mailbox or folder 3105 is dropped in a location other than the favorites bar 2720, it disappears in an alternate animation or simply disappears from the display.

For one embodiment, the deactivation of a mail account will not automatically remove the corresponding mailbox or folder from the favorites bar 2720. For one embodiment, the data processing system 100 presents the mailbox or folder for a deactivated account in a different appearance, e.g., "grayed out," translucent, or another appearance to display it differently from an active mailbox or folder. For an alternate embodiment, the data processing system 100 removes a mailbox or folder from the favorites bar automatically in response to deactivating the associated account.

Figure 46:
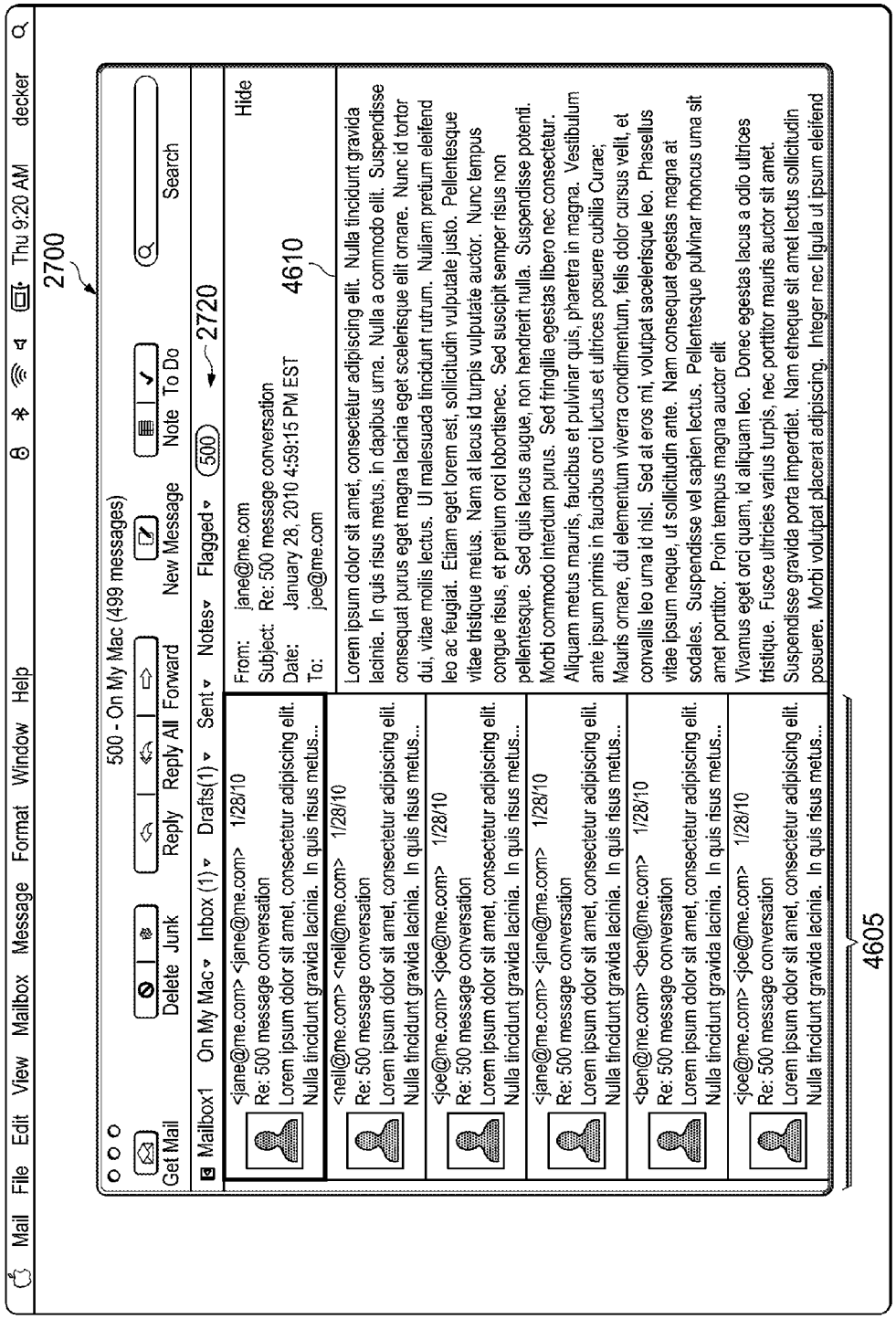
FIGS. 46-47 illustrate an exemplary mail user interface in which the mailbox panel has been collapsed and a favorites bar is used to navigate between mailboxes and folders.
Figure 47:
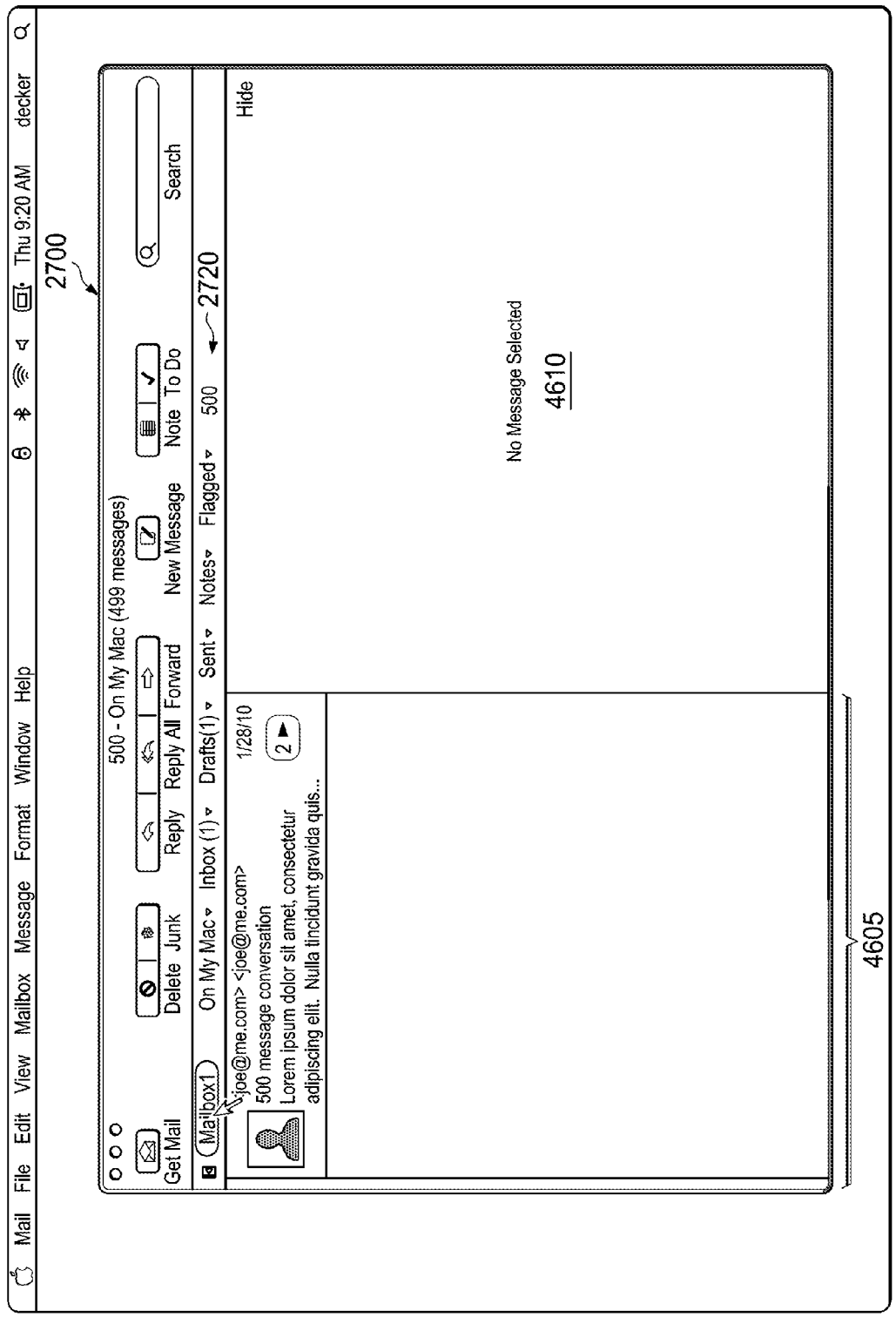

FIGS. 46-47 illustrate an exemplary mail user interface 2700 in which the collapsible panel of mailboxes and folders 2705 has been collapsed and the favorites bar 2720 is used to navigate between mailboxes and folders. For example, in FIG. 46, the mailbox or folder "500" in the favorites bar 2720 is highlighted to indicate that the mailbox or folder "500" is currently selected and that its contents are displayed in the preview pane 4605 and message pane 4610. In FIG. 47, the mailbox or folder "Mailbox 1" in the favorites bar 2720 is selected (e.g., by clicking on it by way of a mouse or other cursor control device). As a result, the mailbox or folder "Mailbox 1" in the favorites bar 2720 is highlighted to indicate that the mailbox or folder "Mailbox 1" is currently selected and that its contents are displayed in the preview pane 4605 and, if a message in the preview pane 4605 were selected, in message pane 4610.

For one embodiment, the data processing system 100 will navigate from one mailbox or folder to another mailbox or folder in the favorites bar 2720 in response to receiving a keyboard shortcut input. For example, each mailbox or folder in the favorites bar 2720 may be assigned a number and a keyboard shortcut using said number will switch the mail user interface 2700 to the corresponding mailbox or folder. For example, if mailboxes and folders from left to right in the favorites bar 2720 were numbered 1, 2, 3, etc., the keyboard shortcuts Cmd-1 (the combination of Command and 1 keys all being pressed), Cmd-2, Cmd-3, etc. would cause the data processing system 100 to navigate to the mailbox or folder in the favorites bar 2720 corresponding to the number in the keyboard shortcut command.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A computer-implemented method of presenting an email user interface comprising:
    receiving a reply or forward command for a selected email message; and
    displaying a composition window in response to the command, wherein the displaying includes a sequence of at least three images to create the illusion of the composition window popping out of the selected email message;
    wherein the sequence of at least three images includes: an initial image that is a copy of the selected email message, a final image of the composition window including an editable body, and at least one image between the initial image and the final image that has characteristics of both the initial and final images;
    wherein elements of the selected email message appear in the initial image but not in the final image, elements of the composition window appear in the final image but not in the initial image, and elements of the email user interface behind the composition window are dimmed and not selectable.

2. The computer-implemented method of claim 1, wherein the elements of the selected email message that appear in the initial image but not in the final image fade-out as the sequence of images progresses from the initial image to the final image.

3. The computer-implemented method of claim 1, wherein the elements of the composition window that appear in the final image but not in the initial image fade-in as the sequence of images progresses from the initial image to the final image.

4. The computer-implemented method of claim 1, wherein the sequence of the at least three images increase in size from the initial image to the final image.

5. The computer-implemented method of claim 1, wherein the sequence of the at least three images appear sequentially along an arced path originating from the selected email message.

6. The computer-implemented method of claim 1, wherein the email user interface is in full screen mode until the composition window is closed.

7. An apparatus to present an email user interface, the apparatus comprising:
    a processing device, wherein the processing device executes instructions that cause the processing device to
        receive a reply or forward command for a selected email message;
        display a composition window in response to the command, wherein the displaying includes a sequence of at least three images to create the illusion of the composition window popping out of the selected email message;
    wherein the sequence of at least three images includes: an initial image that is a copy of the selected email message, a final image of the composition window including an editable body, and at least one image between the initial image and the final image that has characteristics of both the initial and final images;
    wherein elements of the selected email message appear in the initial image but not in the final image, elements of the composition window appear in the final image but not in the initial image, and elements of the email user interface behind the composition window are dimmed and not selectable.

8. The apparatus of claim 7, wherein the elements of the selected email message that appear in the initial image but not in the final image fade-out as the sequence of images progresses from the initial image to the final image.

9. The apparatus of claim 7, wherein the elements of the composition window that appear in the final image but not in the initial image fade-in as the sequence of images progresses from the initial image to the final image.

10. The apparatus of claim 7, wherein the sequence of the at least three images increase in size from the initial image to the final image.

11. The apparatus of claim 7, wherein the sequence of the at least three images appear sequentially along an arced path originating from the selected email message.

12. The apparatus of claim 7, wherein the email user interface is in full screen mode until the composition window is closed.

13. A machine-readable storage medium storing instructions that, when executed, cause a processing device to perform a method comprising:
    receiving a reply or forward command for a selected email message;
    displaying a composition window in response to the command, wherein the displaying includes a sequence of at least three images to create the illusion of the composition window popping out of the selected email message;
    wherein the sequence of at least three images includes: an initial image that is a copy of the selected email message, a final image of the composition window including an editable body, and at least one image between the initial image and the final image that has characteristics of both the initial and final images;
    wherein elements of the selected email message appear in the initial image but not in the final image, elements of the composition window appear in the final image but not in the initial image, and elements of the email user interface behind the composition window are dimmed and not selectable.

14. The machine-readable storage medium of claim 13, wherein the elements of the selected email message that appear in the initial image but not in the final image fade-out as the sequence of images progresses from the initial image to the final image.

15. The machine-readable storage medium of claim 13, wherein the elements of the composition window that appear in the final image but not in the initial image fade-in as the sequence of images progresses from the initial image to the final image.

16. The machine-readable storage medium of claim 13, wherein the sequence of the at least three images increase in size from the initial image to the final image.

17. The machine-readable storage medium of claim 13, wherein the sequence of the at least three images appear sequentially along an arced path originating from the selected email message.

18. The machine-readable storage medium of claim 13, wherein the email user interface is in full screen mode until the composition window is closed.

* * * * *